(12) United States Patent
Hagano

(10) Patent No.: US 9,919,596 B2
(45) Date of Patent: Mar. 20, 2018

(54) OPEN-CLOSE DEVICE FOR FUEL TANK

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 59 days.

(21) Appl. No.: 15/049,507

(22) Filed: Feb. 22, 2016

(65) Prior Publication Data

US 2016/0250920 A1 Sep. 1, 2016

(30) Foreign Application Priority Data

Feb. 26, 2015 (JP) .................................. 2015-36229
Feb. 26, 2015 (JP) .................................. 2015-36230

(51) Int. Cl.
*B65B 3/00* (2006.01)
*B60K 15/04* (2006.01)

(52) U.S. Cl.
CPC ...... *B60K 15/04* (2013.01); *B60K 2015/0429* (2013.01); *B60K 2015/0461* (2013.01)

(58) Field of Classification Search
CPC ............ B60K 15/04; B60K 2015/0429; B60K 2015/0461
USPC .......................................... 137/592; 220/86.2
See application file for complete search history.

(56) References Cited

U.S. PATENT DOCUMENTS

| 6,155,316 A | 12/2000 | Benjey |
| 7,549,443 B2* | 6/2009 | Levey .................... B60K 15/04 137/592 |
| 8,651,151 B2* | 2/2014 | Berghorst .............. B60K 15/04 141/348 |
| 9,393,864 B2* | 7/2016 | Yamamoto ............. B60K 15/04 |

(Continued)

FOREIGN PATENT DOCUMENTS

| JP | 11-82770 A | 3/1999 |
| JP | 2001-47876 A | 2/2001 |

(Continued)

OTHER PUBLICATIONS

Notification of Reasons for Refusal dated Jan. 23, 2018 issued in corresponding JP patent application No. 2015-036229 (and English translation thereof).

(Continued)

*Primary Examiner* — Shawn M Braden
(74) *Attorney, Agent, or Firm* — Posz Law Group, PLC

(57) ABSTRACT

An object is to provide a technique that suppresses deformation or the like of a spring provided to close a flap valve in an open-close device for fuel tank. The open-close device for fuel tank comprises a filler port-forming member that is configured to form a filler port of a fuel passage; an open-close member that is configured to open and close the filler port; and a double torsion spring that is configured to include a pressing portion arranged to press the open-close member in a valve closing direction and two coil portions connected with respective ends of the pressing portion and is supported by the filler port-forming member in a rotatable manner. The double torsion spring has a space defined by the two coil portions. The filler port-forming member is placed in the space and has a restricting element configured to restrict deformation of the double torsion spring.

10 Claims, 24 Drawing Sheets

(56) References Cited

U.S. PATENT DOCUMENTS

| | | |
|---|---|---|
| 2005/0233848 A1 | 10/2005 | Uehara et al. |
| 2010/0226131 A1 | 9/2010 | Higuchi et al. |
| 2013/0340866 A1 | 12/2013 | Sasaki |
| 2014/0346171 A1 | 11/2014 | Yamamoto et al. |
| 2015/0048087 A1* | 2/2015 | Hagano .................. B60K 15/04 220/86.2 |

FOREIGN PATENT DOCUMENTS

| | | |
|---|---|---|
| JP | 2005-291469 A | 10/2005 |
| JP | 3119147 U | 2/2006 |
| JP | 2010-522665 A | 7/2010 |
| JP | 2010-205660 A | 9/2010 |
| JP | 2012-162165 A | 8/2012 |
| JP | 2013-203276 A | 10/2013 |
| WO | 2011/053563 A1 | 5/2011 |
| WO | 2013/069096 A1 | 5/2013 |

OTHER PUBLICATIONS

Notification of Reasons for Refusal dated Jan. 30, 2018 issued in corresponding JP patent application No. 2015-036230 (and English translation thereof).

* cited by examiner

VIEW ALONG ARROW A

ENLARGED VIEW X1

OPEN-CLOSE DEVICE FOR FUEL TANK

CROSS-REFERENCE TO RELATED APPLICATIONS

This application claims priorities to Japanese Patent Applications No. 201.5-36229 filed on Feb. 26, 2015, and No. 2015-36230 filed on Feb. 26, 2015, entire disclosures of which are incorporated herein by reference for all purposes.

TECHNICAL FIELD

The present invention relates to an open-close device for fuel tank.

DESCRIPTION OF RELATED ART

The technique described in WO 2011/153563A has been known with regard to an open-closed device for fuel tank. This open-close member for fuel tank includes a tank opening-forming member that is configured to form a fuel passage for supplying a fuel to a fuel tank, a flap valve that is configured to open and close a filler port provided in the tank opening-forming member, and a gasket that is configured to seal between the filler port and the flap valve. The tank opening-forming member includes a valve support member that is provided to form the filler port. The flap valve is supported on the valve support member in a rotatable manner by a shaft support mechanism. In the open-close device for fuel tank, in the fueling process, the flap valve is pressed by an edge of a fueling nozzle and is thereby rotated by the shaft support mechanism, and the fueling nozzle is inserted into the filler port. In this state, the fuel discharged from the fueling nozzle is supplied through the fuel passage to the fuel tank.

According to the technique described in JP 2013-203276A, when a flap valve formed at a filler port of fuel is pressed by an edge of a fueling nozzle to be opened, a rotation restricting mechanism serves to restrict rotation of the open-close device by the flap valve and restrict the position of the open-close device. This improves the sealing property of a gasket placed in the open-close device.

SUMMARY

A double torsion spring may be used as a spring provided to press the flap valve in a valve closing direction. The techniques described in WO 2011/53563A and in JP 2013-203276A are likely to cause deformation of a space between two coil portions of the double torsion spring or to cause a failure in pressing the flap valve by the double torsion spring with a predetermined force. With regard to the prior art open-close device for fuel tank, other needs include downsizing, cost reduction and easy manufacture.

In order to solve at least part of the problems described above, the invention may be implemented by the following aspects or configurations.

(1) According to one aspect of the invention, there is provided an open-close device for fuel tank that is configured to open and close a fuel passage arranged to introduce a fuel supplied from a fueling nozzle into a fuel tank. The open-close device for fuel tank comprises a filler port-forming member that is configured to form a filler port as a section of the fuel passage; an open-close member that is configured to open and close the filler port; and a double torsion spring that is configured to include a pressing portion arranged to press the open-close member in a valve closing direction and two coil portions connected with respective ends of the pressing portion and is supported by the filler port-forming member in a rotatable manner. The double torsion spring has a space defined by the two coil portions. The filler port-forming member has a first restricting element that is placed in the space and is configured to restrict deformation of the double torsion spring. In the open-close device for fuel tank of this aspect, the first restricting element serves to restrict deformation of the double torsion spring that reduces the space and shift in position of the double torsion spring due to frequent opening and closing operations of the open-close member. Compared with the prior art open-close device for fuel tank, the open-close device for fuel tank of this aspect restricts deformation and shift in position of the double torsion spring and thereby enables the double torsion spring to press the open-close member with a predetermined force, irrespective of the opening-closing operations of the open-close member.

(2) In the open-close device for fuel tank of the above aspect, the two coil portions may be formed about an identical center axis. At least one of restricting elements is protruded from a surface of the filler port-forming member on which the restricting element is formed, to the center axis along a direction where the double torsion spring is placed. The open-close device for fuel tank of this aspect more effectively restricts deformation and shift in position of the double torsion spring.

(3) In the open-close device for fuel tank of the above aspect, the two coil portions may be formed about an identical center axis. The first restricting element may be protruded from a first surface of the filler port-forming member along a plane perpendicular to the center axis and may be formed to be extended longer than a diameter of the coil portions along the first surface. In the open-close device for fuel tank of this aspect, the first restricting element is placed as the center of positioning on the filler port-forming member. The length of the first restricting element along the first surface which serves as the guide of positioning is greater than the diameter of the double torsion spring. This configuration facilitates manufacture of the open-close device for fuel tank.

(4) In the open-close device for fuel tank of the above aspect, the two coil portions may be formed about an identical center axis. The restricting element may include a first restricting element formed to be protruded from a first surface of the filler port-forming member along a plane perpendicular to the center axis, and a second restricting element formed to be protruded from a second surface that is perpendicular to the first surface. In the open-close device for fuel tank of this aspect, both the first surface and the second surface which the double torsion spring comes in contact with serve to suppress deformation of the double torsion spring and shift in position of the double torsion spring. This configuration enables the double torsion spring to more effectively press the open-close member with a predetermined force, irrespective of the opening-closing operation of the open-close member.

(5) In the open-close device for fuel tank of the above aspect, each of the two coil portions may be formed about a parallel center axis. The first restricting element may be configured to have a thickness along the center axis that is between 80 percent and 95 percent inclusive of a length of the space along the center axis when the double torsion spring closes the open-close member. In the open-close device for fuel tank of this aspect, the first restricting element does not unnecessarily come in contact with and restrict the double torsion spring in the range where the open-close member is opened and closed. This configuration enables the double torsion spring to press the open-close member with a more accurate predetermined force, irrespective of the opening-closing operation of the open-close member.

(6) The open-close device for fuel tank of the above aspect may further comprise a flap valve mechanism that is configured to open and close the filler port in the filler port-forming member and is provided to be rotatable relative to the filler port-forming member at a rotating shaft end by the double torsion spring. The flap valve mechanism may include an open-close member that is pressed in a valve closing direction to close the filler port by the double torsion spring and is configured to come in contact with the double torsion spring on a free end side that is opposed to the rotating shaft end in at least a valve-closing state. In the open-close device for fuel tank of this aspect, when the flap valve mechanism is closed, the double torsion spring comes in contact with the open-close member on the free end side. This causes the open-close member to rotate and to be translated toward the fuel tank side even when the pressing force of the double torsion spring to press the open-close member is unchanged. This increases the space of the fuel passage when being opened by the open-closed member. This results in increasing the amount of the air flowing from the outside air to the fuel tank and suppresses deformation of the fuel tank.

(7) In the open-close device for fuel tank of the above aspect, the open-close member may come in contact with the double torsion spring at a protrusion formed on the free end side. The open-closed device for fuel tank of this aspect can change the position of contact by changing the position of the protrusion. This improves the flexibility of design.

(8) In the open-close device for fuel tank of the above aspect, the protrusion may be is formed parallel to a rotating shaft of the open-close member. Even when the position of contact is shifted by, for example, deformation or shift in position of the double torsion spring, the open-close device for fuel tank of this aspect keeps the distance from the rotating shaft to the position of contact unchanged. This ensures the constant inflow of the air flowing from the outside air in the valve open state of the flap valve mechanism in the case where the fuel tank has a negative pressure, (9) In the open-close device for fuel tank of the above aspect, the protrusion may be formed to be wider than a contact area with the double torsion spring. In the open-close device for fuel tank of this aspect, the double torsion spring comes in contact with the protrusion in the valve closed state of the flap valve mechanism even when the double torsion spring is deformed or shifted in position. This ensures the constant inflow of the air flowing from the outside air in the valve open state of the flap valve mechanism in the case where the fuel tank has a negative pressure.

(10) In the open-close device for fuel tank of the above aspect, the open-close member may include a spring restricting element configured to restrict position of the double torsion spring along a rotating shaft of the double torsion spring. The open-close device for fuel tank of this aspect restricts the distance from the rotating shaft to the position of contact in a certain range even when the double torsion spring is deformed or shifted in position. This configuration causes the double torsion spring to come in contact with the open-closed member at the position of contact when the flap valve mechanism is closed. This ensures the constant inflow of the air flowing from the outside air in the valve open state of the flap valve mechanism in the case where the fuel tank has a negative pressure.

The invention may be implemented by various aspects other than the open-close device for fuel tank of any of the above aspects. For example, the invention may be implemented by; for example, a method of manufacturing the open-close device for fuel tank or a vehicle equipped with the open-close device for fuel tank.

Compared with the prior art open-close device for fuel tank, the open-close device of any of the above aspects restricts deformation and shift in position of the double torsion spring. This configuration suppresses reduction of the pressing force of the double torsion spring that is set in the process of manufacturing the open-close device for fuel tank, irrespective of the opening-closing operations of the open-close member.

BRIEF DESCRIPTION OF DRAWINGS

DESCRIPTION OF EMBODIMENTS (1) General Structure of Open-Close Device for Fuel Tank FIG. 1 is a perspective view illustrating an open-close device 10 for fuel tank according to a first embodiment of the invention. A fuel lid FL for fuel supply is held in an openable and closable manner on a rear portion of an automobile body. The fuel lid FL has a lid main body FLa along the outer panel of the body supported in an openable and closable manner on the outer panel of the body via a hinge FLb. The space accessible by opening the fuel lid FL serves as a fuel filler chamber FR. The open-close device 10 for fuel tank mounted on a base plate BP is located in this fuel filler chamber FR. The open-close device 10 for fuel tank is a mechanism configured to supply the fuel to a fuel tank without using a fuel cap or more specifically a mechanism configured to open and close a valve placed in a fuel passage with an external force from a fueling nozzle after opening the fuel lid FL and thereby enabling the fueling nozzle to supply the fuel to the fuel tank. The following describes the detailed structure of the open-close device for fuel tank.

(2) Structures and Operations of Respective Components

Figure 1:
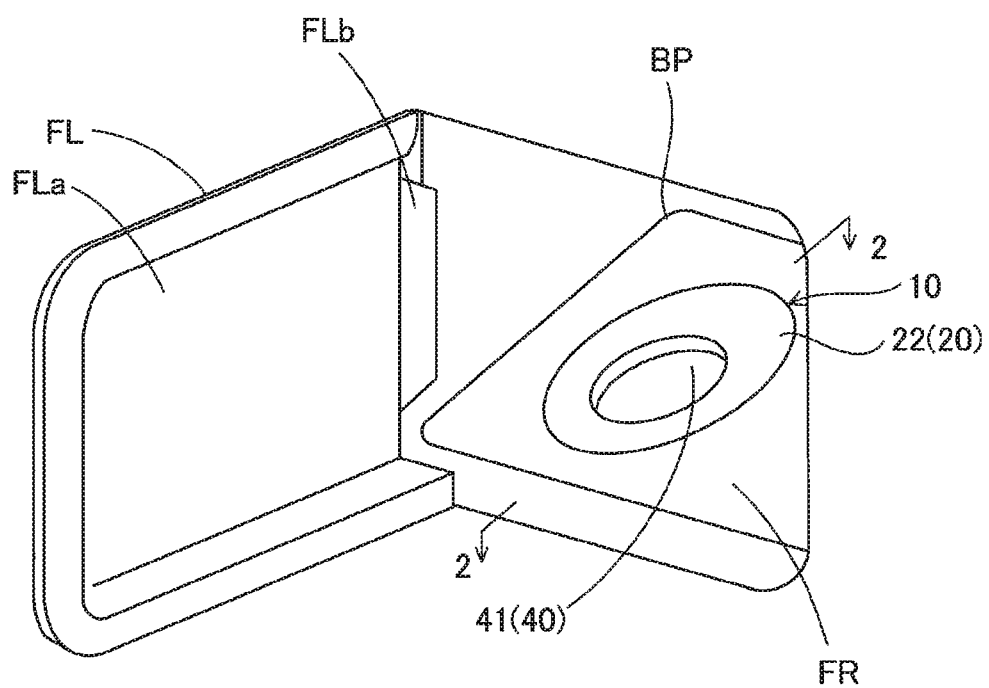
FIG. 1 is a perspective view illustrating an open-close device for fuel tank according to one embodiment of the invention.
Figure 2:
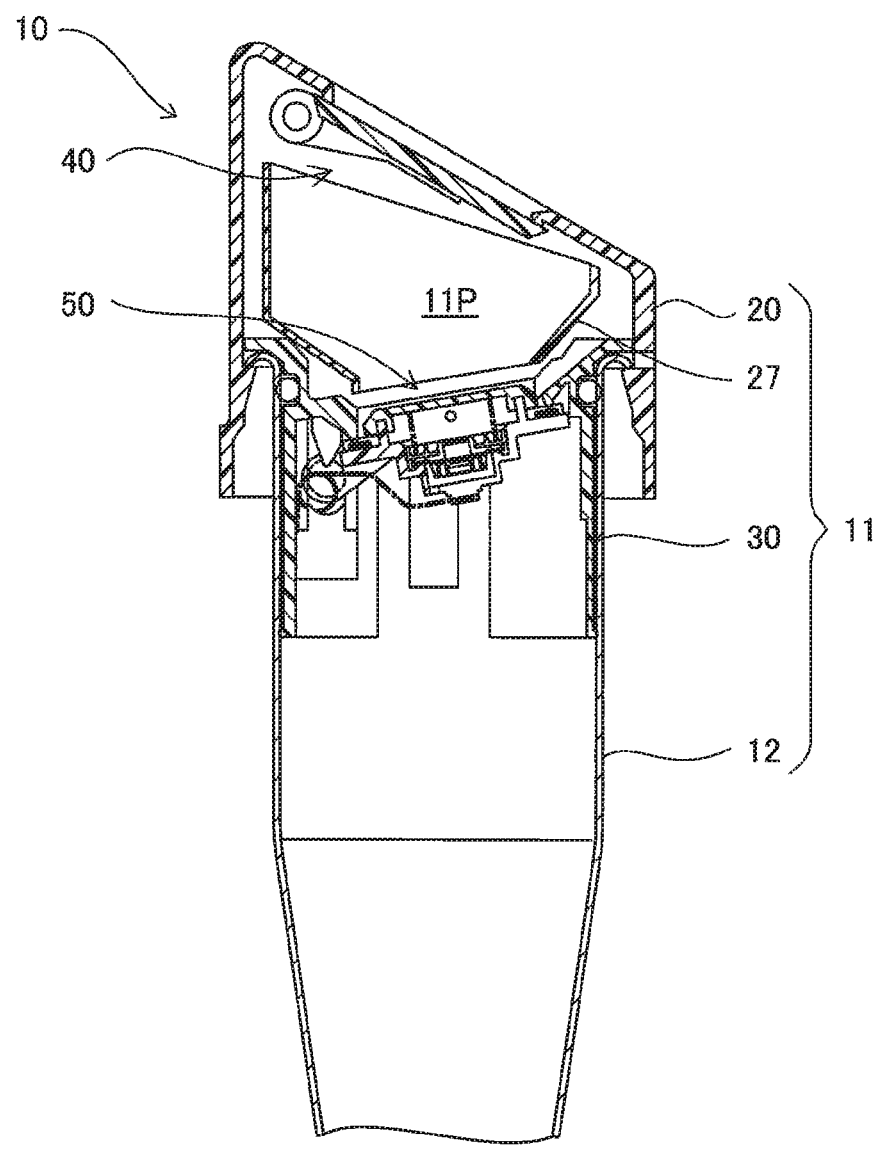
FIG. 2 is a cross sectional view taken on a line 2-2 in FIG. 1.
Figure 3:
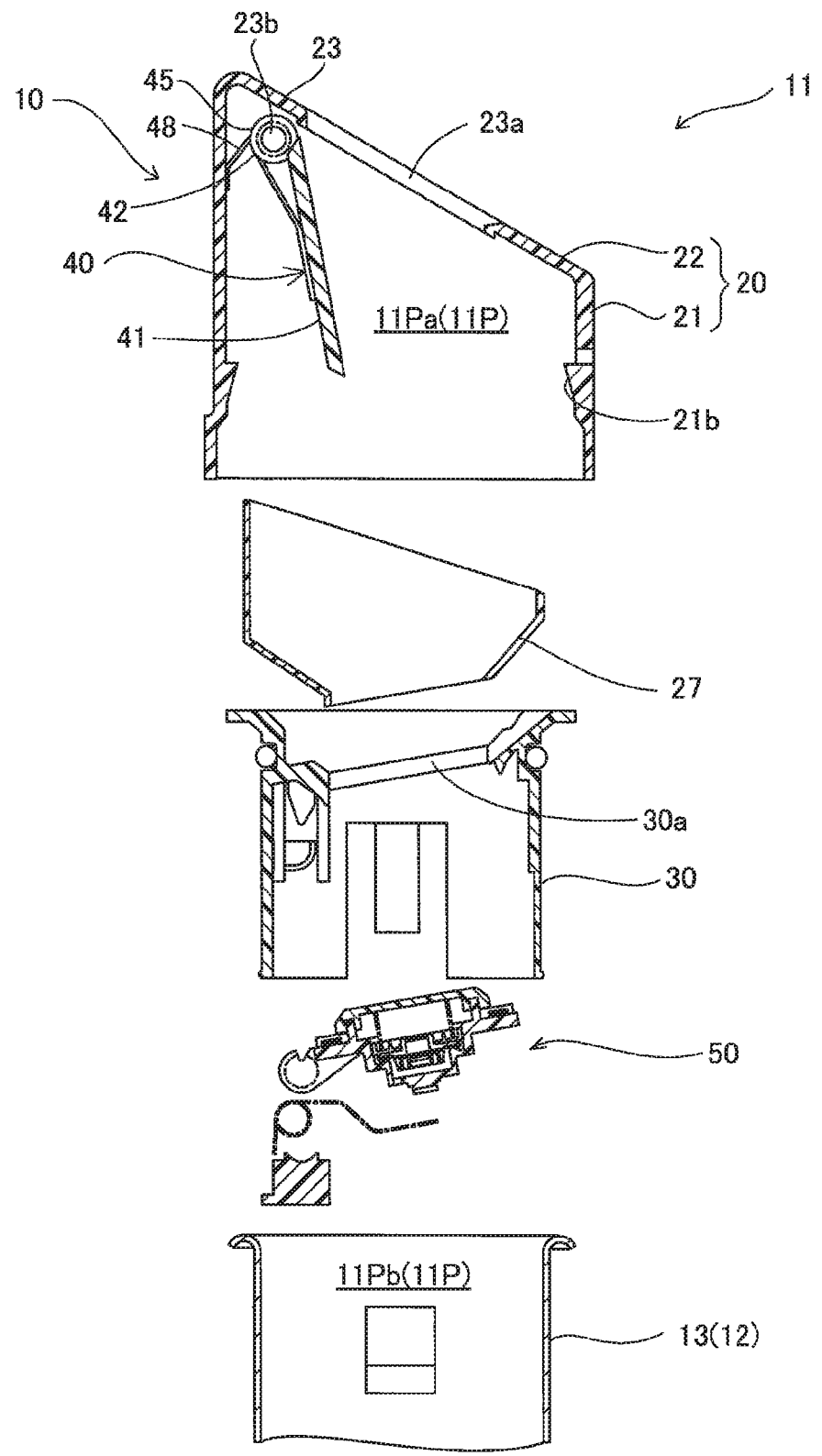
FIG. 3 is an exploded cross sectional view of the open-close device for fuel tank in FIG. 2.

FIG. 2 is a cross sectional view taken on a line 2-2 in FIG. 1. FIG. 3 is an exploded cross sectional view of the open-close device 10 for fuel tank of FIG. 2. The open-close device 10 for fuel tank has a tank opening-forming member 11 configured to define a fuel passage 11P that is connected to a fuel tank (not shown), a shutter mechanism 40 and a flap valve mechanism 50.

(2)-1. Tank Opening-Forming Member 11

With referring to FIG. 3, the tank opening-forming member 11 is a member defining the fuel passage HP and includes a tubular body 12 connected to the fuel tank, a cover member 20 attached to an upper portion of the tubular body 12, an insertion guide member 27 placed in the cover member 20, and a valve support member 30 mounted on the upper portion of the tubular body 12.

The tubular body 12 is a provided as a pipe made of a metal and includes a tube main body 13 connected to the fuel tank. The cover member 20 is attached to an upper portion of the valve support member 30 and includes a cylindrical side wall section 21 and a cover upper plate 22. The side wall section 21 is in a cylindrical shape having a sloped upper portion, and the cover upper plate 22 is integrally formed with the sloped upper portion. The cover upper plate 22 has an opening structure 23, which the fueling nozzle is inserted in. The opening structure 23 has an insertion opening 23a and a shaft support 23b. The insertion opening 23a is formed in a substantially circular shape for insertion of the fueling nozzle and is configured to define part of the fuel passage 11P and to be narrower than the passage area of the fuel passage 11P The shaft support 23b is formed on one end of the insertion opening 23a and is provided as a location which an end of the shutter mechanism 40 is attached to and supported on. The cover member 20 is mounted on the upper portion of the valve support member 30 by engagement between an engagement claw 21b provided on a lower portion of the side wall section 21 and an engagement structure provided on an upper portion of the valve support member 30.

The insertion guide member 27 is placed in the cover member 20 and is provided as a member serving to guide the fueling nozzle inserted into the fuel passage 11P and connect the insertion opening 23a of the cover upper plate 22 with a filler port 30a of the valve support member 30. The insertion guide member 27 is formed in a conical shape sloped to narrow the passage area toward the filler port 30a of the valve support member 30, so as to promptly flow the fuel entering an insertion passage 11Pa toward the filler port 30a.

Figure 4:
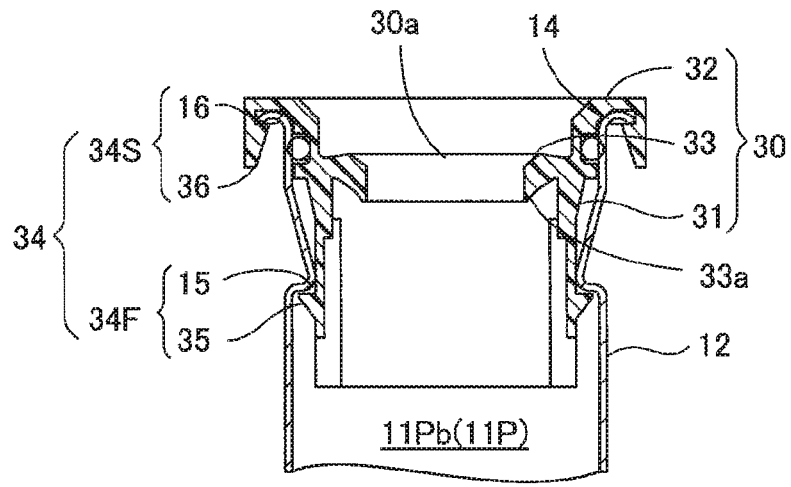
FIG. 4 is a diagram illustrating a state of assembly of a tubular body with a valve support member.
Figure 5:
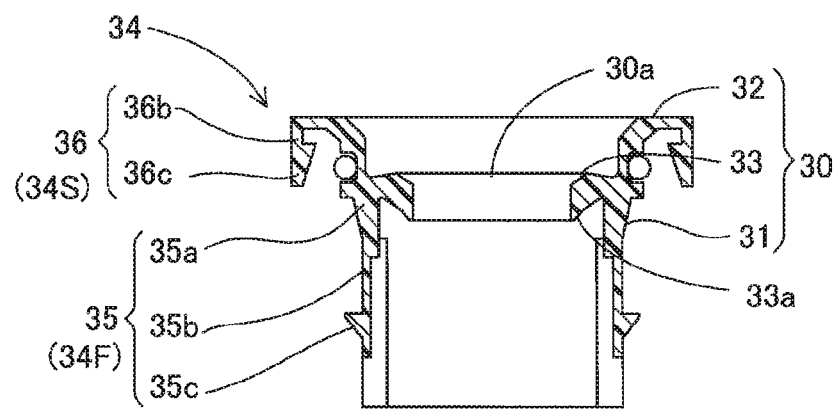
FIG. 5 is a cross sectional view illustrating a state prior to assembly of the tubular body with the valve support member.
Figure 5:
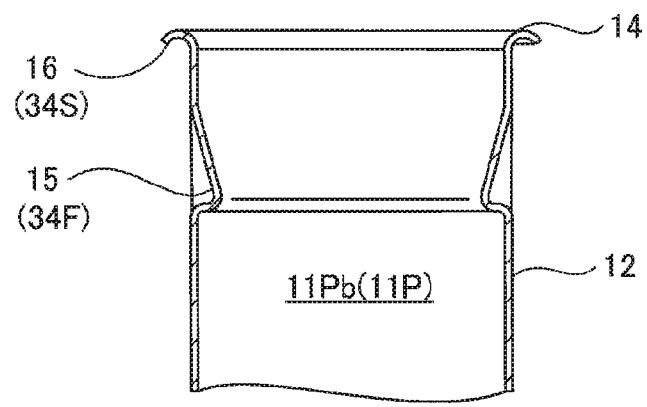
Figure 6:
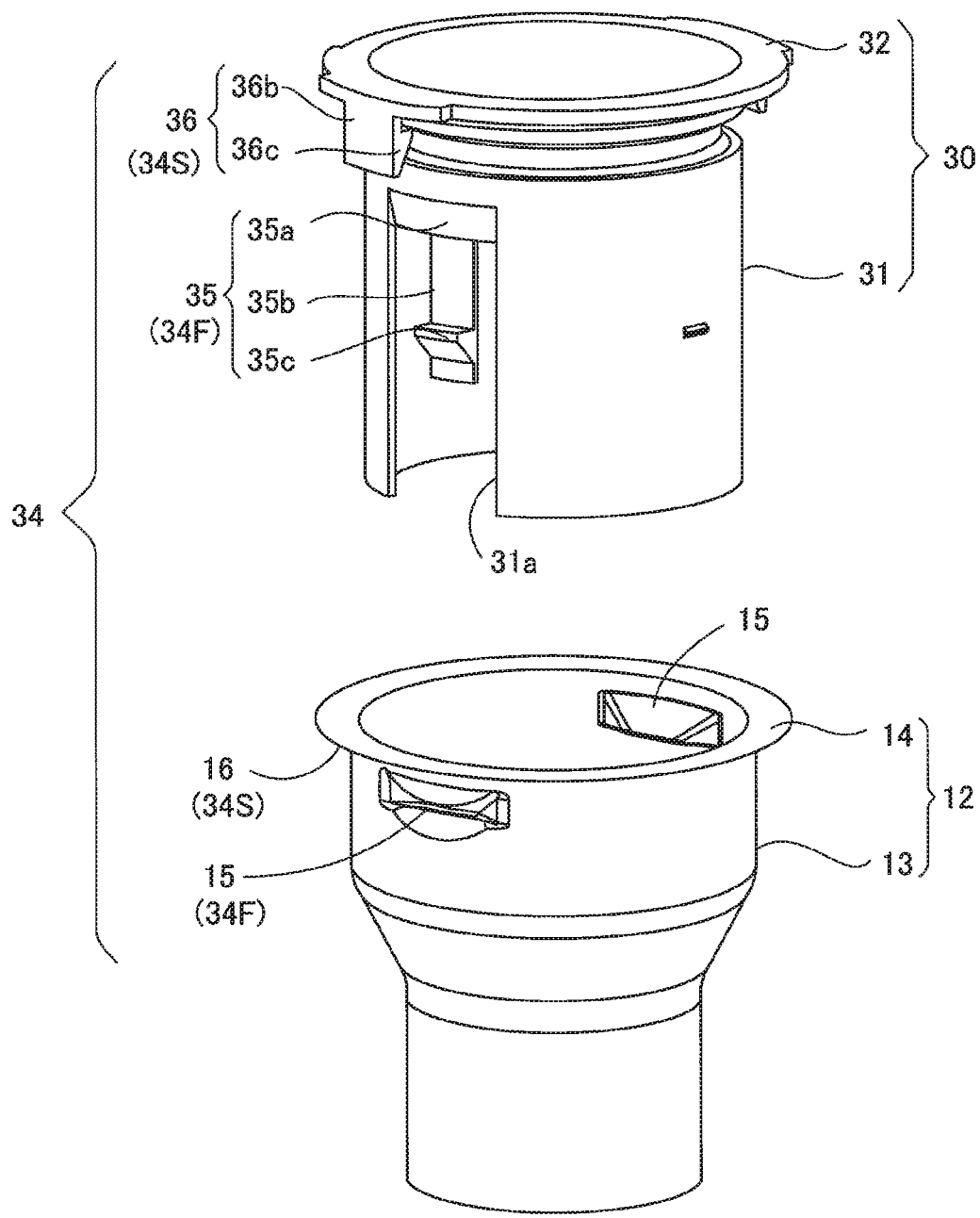
FIG. 6 is a perspective view illustrating the state prior to assembly of the tubular body with the valve support member.

FIG. 4 is a diagram illustrating a state of assembly of the tubular body 12 with the valve support member 30. FIG. 5 is a cross sectional view illustrating a state prior to assembly of the tubular body 12 with the valve support member 30. FIG. 6 is a perspective view illustrating the state prior to assembly of the tubular body 12 with the valve support member 30.

The valve support member 30 is mounted on the upper portion of the tubular body 12. Attachment of the flap valve mechanism 50 (FIG. 3) to the valve support member 30 serves to divide the fuel passage 11P into the insertion passage 11Pa (FIG. 2) and a tank-side passage 11Pb that is a passage on the fuel tank side. The valve support member 30 includes a valve support main body 31 in a cylindrical shape, a flange 32, and a filler port-forming member 33 configured to define the filler port 30a. These components are formed integrally.

The valve support main body 31 is formed in a cylindrical shape to be inserted in the tubular body 12 and has an inner space that defines part of the fuel passage 11P. The flange 32 is formed to be protruded outward from an upper end of the valve support main body 31 and is in contact with a flange 14 of the tubular body 12. The filler port-forming member 33 is formed to be inclined relative to a plane perpendicular to the axial direction and to define the filler port 30a. A seat section 33a is formed on the lower face side of the opening periphery of the filler port 30a, i.e., on the opening periphery of the fuel tank side.

FIG. 6 is the cross sectional view illustrating the state prior to assembly of the tubular body 12 with the valve support member 30 via a coupling mechanism 34. The coupling mechanism 34 is provided as a mechanism serving to attach the valve support member 30 to the tubular body 12 and includes a first coupling part 34F and a second coupling part 34S.

The first coupling part 34F includes first pipe-side engagement structures 15 of the tubular body 12 and inner coupling structures 35 of the valve support member 30. The first pipe-side engagement structures 15 are formed by recessing parts of the tubular body 12 toward its center and along the circumferential direction. The two first pipe-side engagement structures 15 are formed in a predefined width and are arranged at two different positions of 180 degrees away from each other about the axis of the tube main body 13 of the tubular body 12. The inner coupling structures 35 are members respectively provided to engage with the first pipe-side engagement structures 15. The inner coupling structure 35 includes an engagement piece 35b formed downward to be cantilevered from a base section 35a, and a claw 35c formed on a lower portion of the engagement piece 35b to be protruded radially outward. The inner coupling structure 35 is formed such that the claw 35c of the engagement piece 35b is engaged with the first pipe-side engagement structure 15 in the course of attachment of the valve support member 30 to the tubular body 12, so as to prevent the valve support member 30 from being slipped off from the tubular body 12. A specific part of the valve support main body 31, which the inner coupling structure 35 faces, has an opening 31a formed by cutting out the valve support member 31 upward from its lower end. This structure facilitates mold splitting in the process of injection molding.

The second coupling part 34S includes a second pipe-side engagement structure 16 formed on the flange 14 and inner coupling structures 35 formed on the valve support member 30. The second pipe-side engagement structure 16 is formed in a lower face of the flange 14 on the upper portion of the tubular body 12. Each of the outer coupling structures 36 is a member to be engaged with the second pipe-side engagement structure 16 and includes: an engagement piece 36b formed to be cantilevered downward from a lower end of the flange 32 of the valve support member 30 and a claw 35c formed on a lower portion of the engagement piece 36b to be protruded radially inward. The outer coupling structure 36 is formed such that the claw 36c of the engagement piece 36b is engaged with the second pipe-side engagement structure 16 of the flange 14 in the course of attachment of the valve support member 30 to the tubular body 12, so as to prevent the valve support member 30 from being slipped off from the tubular body 12.

The first pipe-side engagement structures 15 and the second pipe-side engagement structure 16 of the flange 14 included in the coupling mechanism 34 may be formed by a metal processing technique such as press forming or swaging.

By using the structure of the coupling mechanism 34 described above, the valve support member 30 is attached to the tubular body 12 by the following procedure as shown in FIGS. 4 and 5. The lower portion of the valve support main bod 31 of valve support member 30 is inserted into the opening of the tubular body 12. The claws 35c of the inner coupling structures 35 come into contact with the first pipe-side engagement structures 15 of the tubular body 12. The engagement pieces 35b are then bent radially inward, and the claws 35c ride over the first pipe-side engagement structures 15 to be engaged with the first pipe-side engagement structures 15. The claws 36c of the outer coupling structures 36 come into contact with the flange 14 of the tubular body 12. The engagement pieces 35b are then bent radially outward, and the claws 35c ride over the flange 14 to be engaged with the second pipe-side engagement structure 16.

(2)-2 Shutter Mechanism 40

Referring to FIG. 3, the shutter mechanism 40 is provided as a mechanism to open and close the insertion opening 23a along with insertion of the fueling nozzle and is fixed to the cover member 20. The shutter mechanism 40 includes a shutter member 41, a bearing 45 configured to support a shaft 42 of the shutter member 41 and fixed to the cover member 20, and a spring 48 configured to press the shutter member 41 in a closing direction. According to this structure of the shutter mechanism 40, when being pressed by an edge of the fueling nozzle FN, the shutter member 41 is rotated about the shaft 42 supported on the bearing 45 against the pressing force of the spring 48 to open the insertion opening 23a. When the fueling nozzle FN is pulled out, the insertion opening 23a is closed by the pressing force of the spring 48.

(2)-3 Flap Valve Mechanism 50

Figure 7:
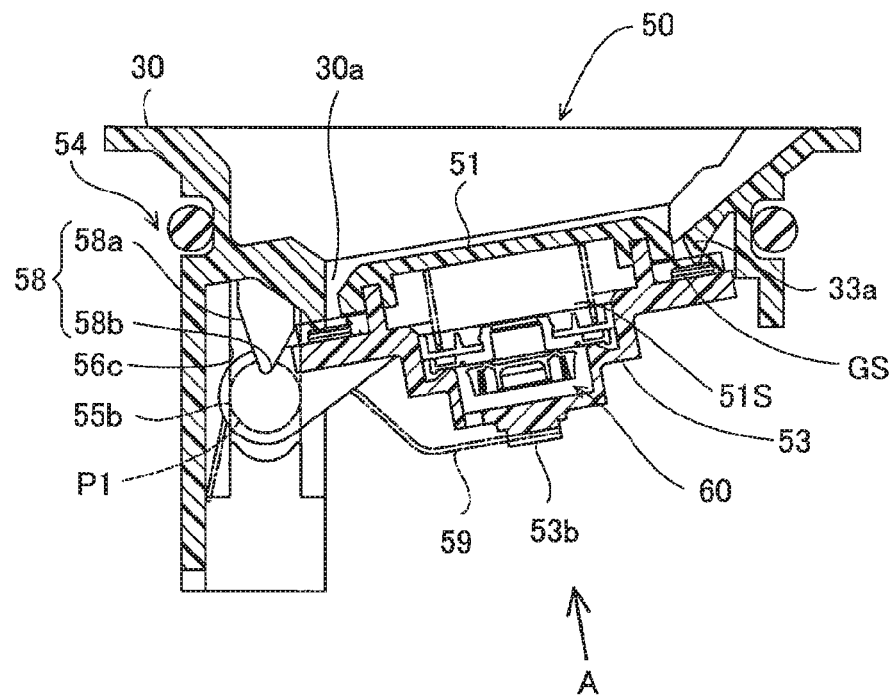
FIG. 7 is a cross sectional view illustrating a flap valve mechanism.

FIG. 7 is a cross sectional view illustrating the flap valve mechanism 50. The flap valve mechanism 50 is provided as a mechanism to open and close the filler port 30a formed in the valve support member 30 and includes: an open-close member 51 configured to open and close the filler port 30a; a shaft support mechanism 54 provided on the open-close member 51 and a valve support member 30 to support the open-close member 51 in a rotatable manner; a spring 59 configured to press the open-close member 51 in a closing direction; a gasket GS compressed in a warping direction (direction of insertion of the fueling nozzle) to seal between the seat section 33a on the opening periphery of the flier port 30a and the open-close member 51; and a pressure regulator 60.

Figure 8:
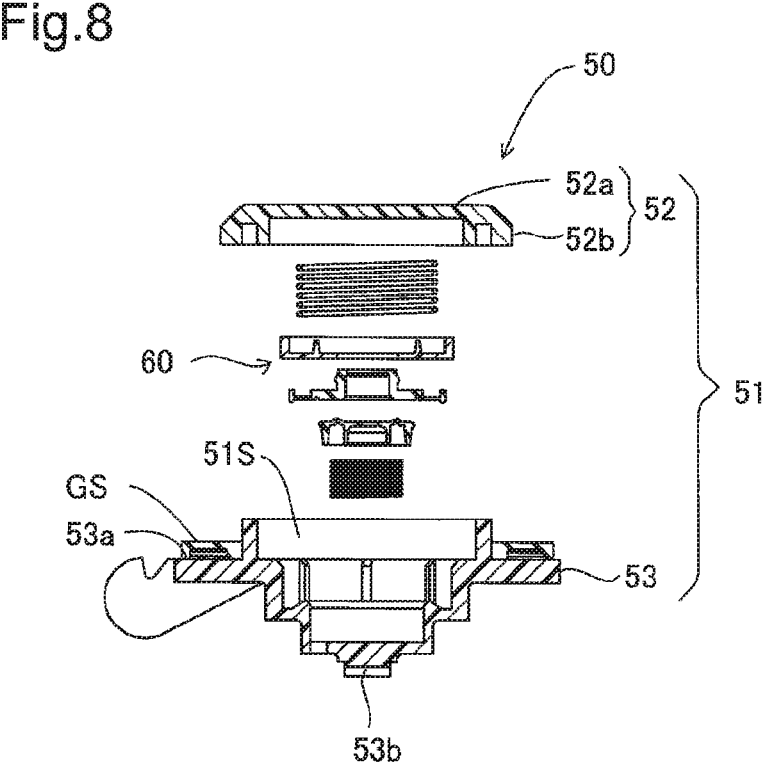
FIG. 8 is an exploded cross sectional view of the flap valve mechanism.
Figure 9:
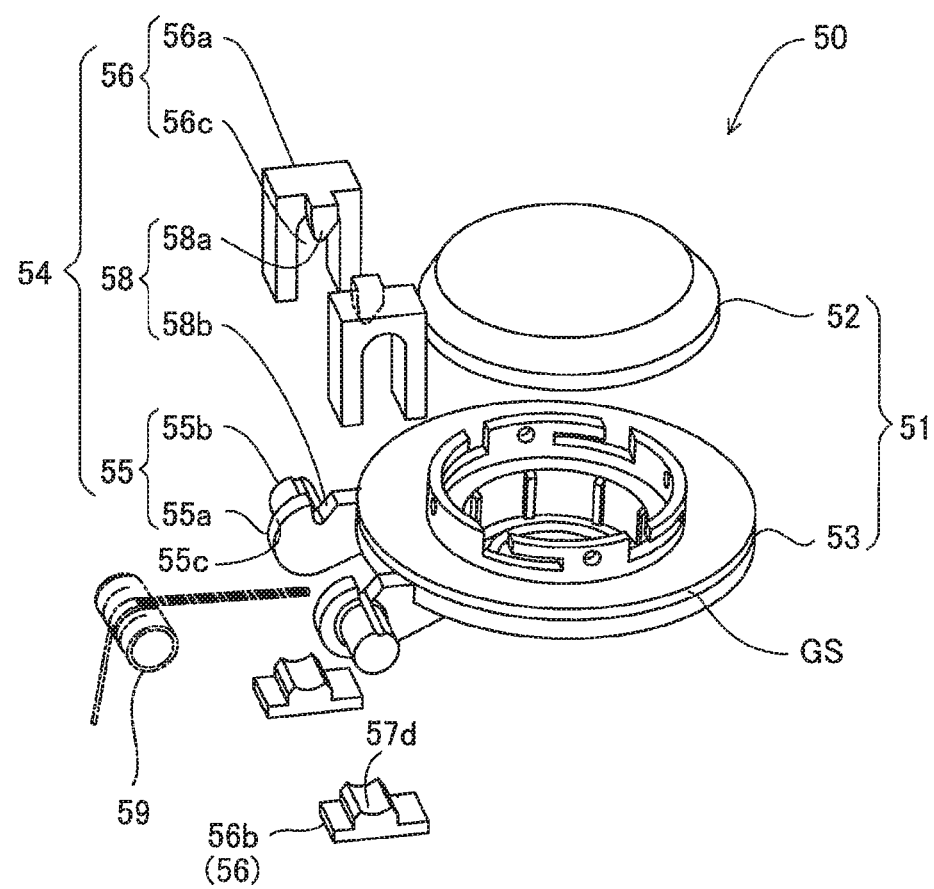
FIG. 9 is an exploded perspective view illustrating the periphery of the flap valve mechanism.

FIG. 8 is an exploded cross sectional view of the flap valve mechanism 50. FIG. 9 is an exploded perspective view illustrating the periphery of the flap valve mechanism 50. The open-close member 51 includes a pressure member 52, a valve chest-defining member 53 and the gasket GS. The pressure member 52 has an upper surface 52a pressed by the fueling nozzle and a side wall 52b protruded from the outer periphery of the upper surface 52a and is formed in a upturned dish shape. The valve chest-defining member 53 is formed in a cup-like shape and is joined with the pressure member 52 to define a valve chest 51S which the pressure regulator 60 is placed in. A flange 53a is formed along the outer circumference of the valve chest-defining member 53. The gasket GS is made of a rubber material and is placed and held between an inner circumferential portion on the upper surface of the flange 53a and an outer circumferential portion of the opening periphery of the pressure member 52. As shown in FIG. 7, the gasket GS is compressed against the seat section 33a of the valve support member 30 to seal the filler port 30a.

Referring to FIG. 9, the shaft support mechanism 54 includes shaft members 55 formed on one end of the open-close member 51 bearing members 56 configured to support the shaft members 55 in a rotatable manner relative to the valve support member 30 (FIG. 7), and a rotation restricting mechanism 58 to restrict the rotation of the shaft members 55 supported by the bearing members 56.

The shaft members 55 include a pair of shaft supports 55a and a pair of shaft bodies 55b. The pair of shaft supports 55a are protruded from an end of the valve chest-defining member 53 to be parallel to each other across a space formed between the shaft supports 55a. The shaft bodies 55b are protruded outward from the respective shaft supports 55a. Each of the bearing members 56 is provided as a mechanism to support the shaft member 55 in a rotatable manner and includes an upper shaft support body 56a and a lower support body 56b. The upper shaft support body 56a is protruded from a lower surface of the opening periphery of the filler port-forming member 33 of the valve support member 30 and has a shaft support hole 56c that is open downward. The shaft support hole 56c is formed as a slot to enable the shaft body 55b of the shaft member 55 to move in the direction of insertion (vertical direction). The open-close member 51 is supported in a rotatable manner by supporting the shaft bodies 55b of the shaft members 55 in the shaft support holes 56c. The lower support bodies 56b are attached to the inner wall of the valve support member 30 via an engagement mechanism (not shown). A bearing projection 57d is formed on the lower support body 56b. The bearing projection 57d is inserted into the shaft support hole 56c to support the lower surface of the shaft body 55b.

The rotation restricting mechanism 58 includes restricting elements 58a and restricted elements 58b. The restricting elements 58a are wedge-like elements protruded downward in a triangular shape from a lower surface of the filler port-forming member 33 and are arranged to respectively face the inside of the pair of upper shaft support bodies 56a. The restricted elements 58b are formed by cutting out parts of the outer peripheries of the respective shaft supports 55a in a triangular shape. Insertion of the restricting elements 58a into the restricted elements 58b restricts the rotation of the open-close member 51. The shaft body 55b has an outer periphery 55c in a substantially circular shape. A cutout that is continuous with the restricted element 58b is formed in a part of the outer periphery 55c, such that the tip of the restricted element 58b is inserted in the cutout.

Figure 10:
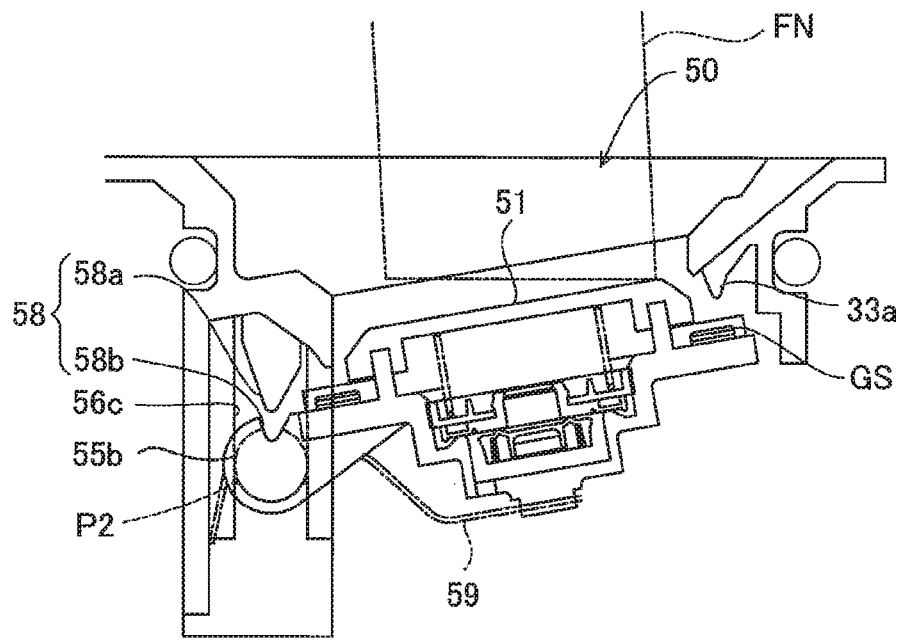
FIG. 10 is a diagram illustrating an open-close operation of the flap valve mechanism.
Figure 11:
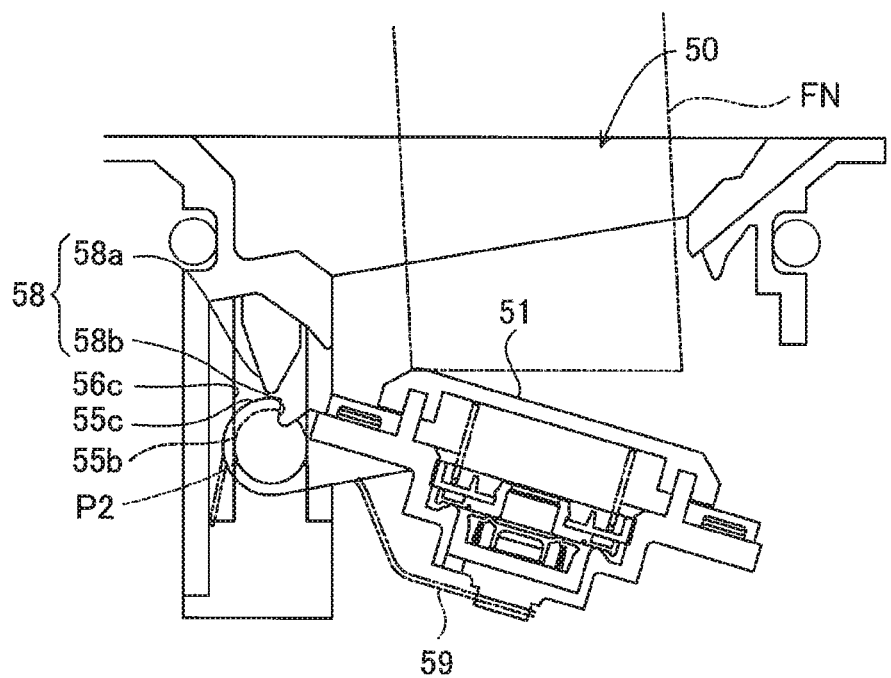
FIG. 11 is a diagram illustrating the open-close operation of the flap valve mechanism.

The spring 59 is a coil spring and has one end of the coil supported on the inner wall of the valve support member 30 (FIG. 7) and the other end supported on the bottom of the open-close member 51. The coiled part of the spring 59 is located between the shaft supports 55a of the shaft members 55 to press the open-close member 51 in a closing direction. As shown in FIG. 7, the other end of the spring 59 is supported on a spring support end 53b on the center of a lower surface of the valve chest-defining member 53. The spring support end 53b supports the other end of the spring 59 to allow for a sliding motion thereof. This structure causes the move of the open-close member 51 to be not restricted by the spring 59 when the open-close member 51 is rotated about the shaft members 55 as the axial center FIGS. 10 and 11 are diagrams illustrating an open-close operation of the flap valve mechanism 50. The open-close member 51 receives a force in the direction of insertion against the force of the spring 59 in the closed state of the open-close member 51 shown in FIG. 7. In this closed state, the pressing force of the spring 59 reaches the shaft bodies 55b across the open-close member 51. The shaft bodies 55b are accordingly located at a first position P1 which is an upper position in the shaft support holes 56c. At the first position P1, the shaft bodies 55b are located in upper regions of the slots of the shaft support holes 56c and are thus enabled to move in the direction of insertion (downward). The restricting elements 58a of the rotation restricting mechanism 58 are engaged with the restricted elements 58b, so that the rotation about the shaft bodies 55b is restricted.

When an edge of a fueling nozzle FN presses the open-close member 51 as shown in FIG. 10, the open-close member 51 receives a force in the direction of insertion against the force of the spring 59. In the state prior to such pressing, the pressing force of the spring 59 reaches the shaft bodies 55b across the open-close member 51, so that the shaft bodies 55b are located at the first position P1 which is the upper position in the shaft support holes 56c. The open-close member 51 receiving the downward force from the fueling nozzle FN moves together with the shaft bodies 55b downward in the shaft support holes 56c. This motion disengages the restricting elements 58a from the restricted elements 58b and causes the shaft bodies 55b to move to a second position P2 which is a lower end position in the shaft support holes 56c. At the second position P2, the open-close member 51 receives the pressing force by the fueling nozzle FN and rotates about the shaft bodies 55b as shown in FIG. 11. With respect to the relationship between the open-close member 51 and the gasket GS, the open-close member 51 warps the gasket GS at the first position P1, whereas the open-close member 51 warps the gasket GS at the second position P2.

(3) Open-Close Operation of Open-Close Device 10 for Fuel Tank

The following describes fueling operation with regard to the open-close device 10 for fuel tank using the fueling nozzle FN.

(3)-1. Opening Operation

Figure 12:
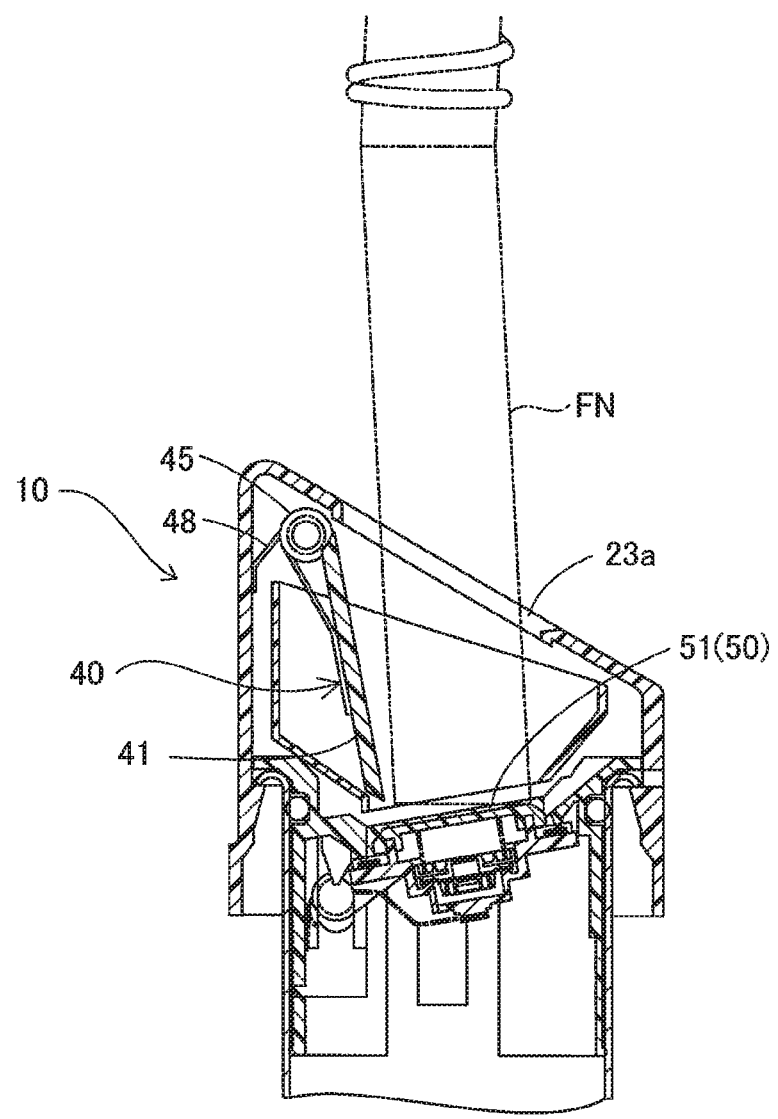
FIG. 12 is a diagram illustrating fueling operation of the open-close device for fuel tank.
Figure 13:
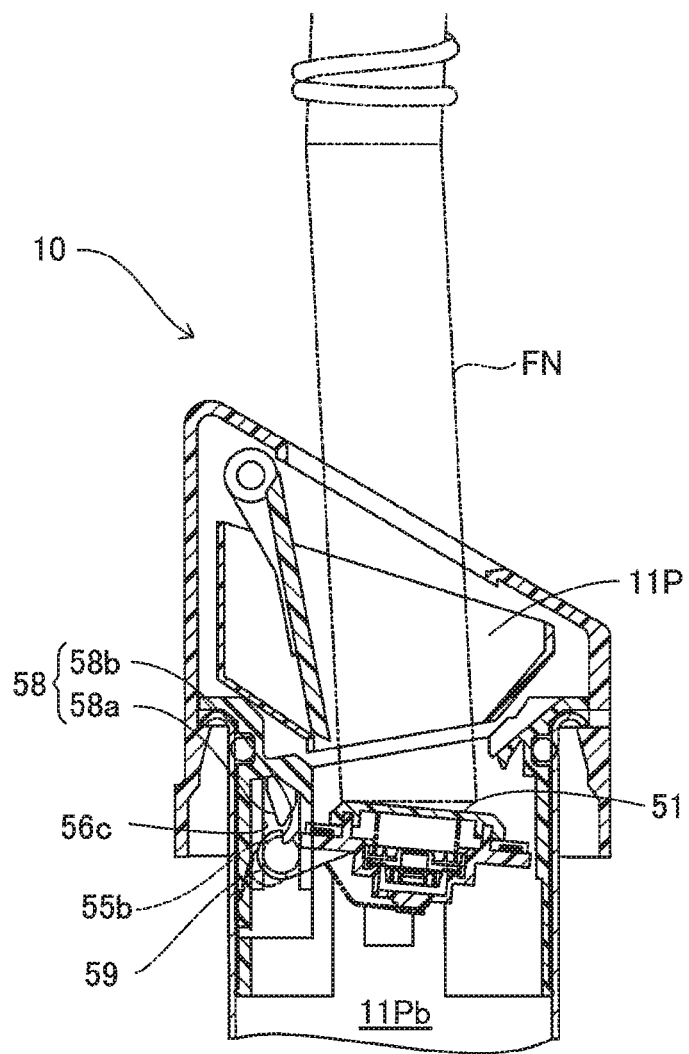
FIG. 13 is a diagram illustrating an operation subsequent to FIG. 12.

Opening the fuel lid FL causes the open-close device 10 for fuel tank placed in the fuel filler chamber FR to be accessible as shown in FIG. 1. Referring to FIG. 12, when the fueling nozzle FN is inserted through the insertion opening 23a and the edge of the fueling nozzle FN presses the shutter member 41, the shutter member 41 rotates about the bearing 45 against the pressing force of the spring 48, so as to cause the fueling nozzle FN to be further inserted until reaching the open-close member 51 of the flap valve mechanism 50. When the edge of the fueling nozzle FN presses the open-close member 51, the state shifts from the state of FIG. 7 to the state of FIG. 10. More specifically, the open-close member 51 moves from the first position P1 to the second position P2 against the pressing force of the spring 59, while the gasket GS is away from the seat section 33a with maintaining its attitude parallel to the plane where the gasket GS is placed. The open-close member 51 receiving the pressing force from the fueling nozzle FN at the second position rotates about the shaft bodies 55b as shown in FIG. 11. This causes the fueling nozzle FN to be inserted into the tank-side passage 11Pb as shown in FIG. 13.

Figure 14:
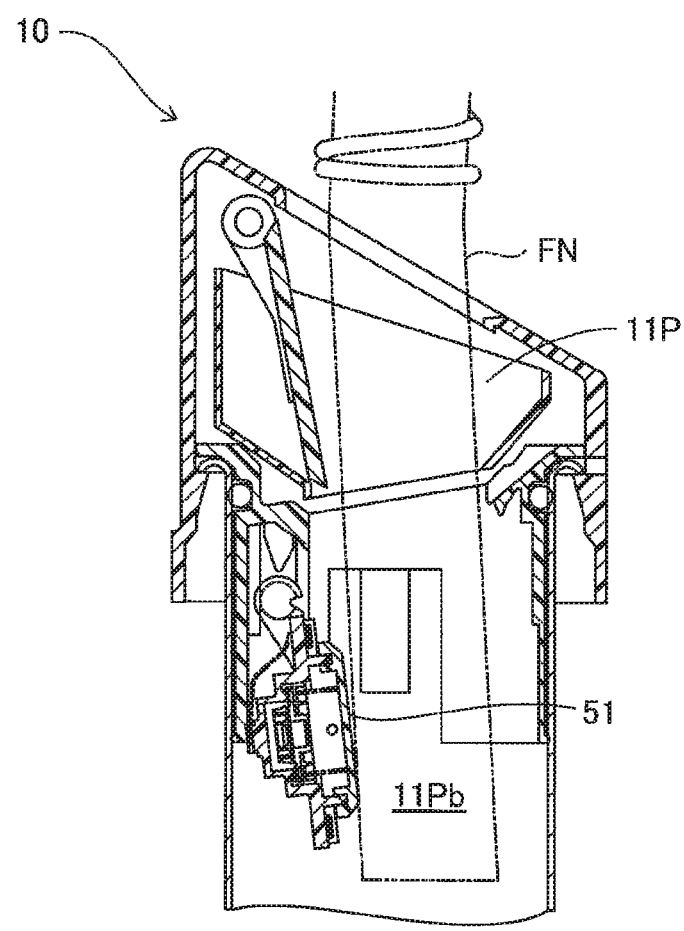
FIG. 14 is a diagram illustrating an operation subsequent to FIG. 13.

Referring to FIG. 14, the fueling nozzle FN further enters the fuel passage 11P and causes the fuel to be supplied from the fueling nozzle FN into the tank-side passage 11Pb. The fuel supply beyond the full level of the fuel tank raises the fuel in the tank-side passage 11Pb. When the fuel enters a detection hole (not shown) formed in the vicinity of the edge of the fuel nozzle FN, an auto stop function of the fueling nozzle FN works to stop any further fuel supply.

(3)-2. Closing Operation

The closing operation of the open-close device 10 for fuel tank proceeds in the reverse order to the opening operation described above. More specifically, when the fueling nozzle FN pulls out of the filler port 30a. on completion of the fuel supply, the open-close member 51 is rotated in the closing direction by the restoring force of the spring 59, along with upward move of the shaft members 55 in the shaft support holes 56c as shown in FIG. 11. When outer peripheries 55c of the shaft supports 55a of the shaft members 55 come into contact with the lower ends of the restricting elements 58a, the upward move of the shaft members 55 is restricted. In this state, when the open-close member 51 is rotated by the restoring force of the spring 59 and makes the restricted elements 58b approach the restricting elements 58a, the shaft members 55 move upward such that the restricting elements 58a move along the outer peripheries 55c in the substantially circular shape and enter the restricted elements 58b. At this moment, the flange 53a of the open-close member 51 compresses the gasket GS. In the state that the restricting elements 58a completely enter the restricted elements 58b, the open-close member 51 closes the filler port 30a. Subsequently, as shown in FIG. 12, when the fueling nozzle FN is pulled out, the shutter member 41 of the shutter mechanism 40 is rotated by the restoring force of the spring 48 on the bearing 45 to close the insertion opening 23a. The fuel lid FL (FIG. 1) is then closed.

4) Functions and Advantageous Effects of Open-Close Device 10 for Fuel Tank

The open-close device 10 for fuel tank according to the embodiment described above has the following functions and advantageous effects.

The invention is not limited to the above embodiment, but a diversity of variations and modifications may be made to the embodiment without departing from the scope of the invention. Some examples of possible modification are described below.

Figure 15:
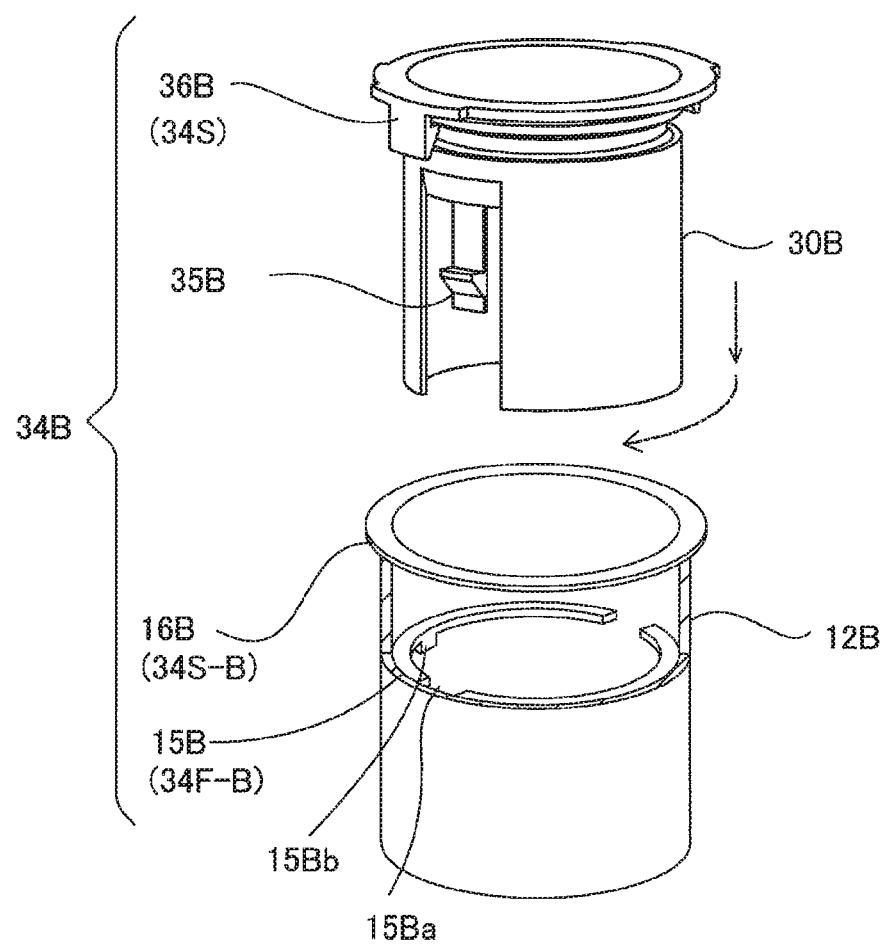
FIG. 15 is a diagram illustrating a state prior to assembly of a tubular body with a valve support member according to another embodiment.

FIG. 15 is a diagram illustrating a state prior to assembly of a tubular body with a valve support member according to another embodiment. This embodiment is characterized by the structure of a first coupling part 34F-8 of a coupling mechanism 34B. More specifically in the first coupling part 34F-B, a ring-shaped first pipe-side engagement structure 15B is protruded on the inner wall of a tubular body 12B, and cutouts 15Ba for insertion are formed in parts of the first pipe-side engagement structure 15B. Stoppers 15Bb are formed on a lower surface of the first pipe-side engagement structure 15B. For attachment of a valve support member 30B to the tubular body 12B, the process adjusts the positions of inner coupling structures 35B at the positions of the cutouts 15Ba and inserts the valve support member 308 in an axial direction into the tubular body 12B. This causes engagement of a second coupling part 34S-B first and thereby couples the valve support member 30B with the tubular body 12B. After that, when the valve support member 30B is rotated relative to the tubular body 12B, the inner coupling structures 35B of the first coupling part 34F-B come into contact with the stoppers 15Bb and stop. The valve support member 30B is accordingly attached to the tubular body 12B via engagement of the coupling mechanism 34B at the two different positions. As described in this embodiment, the coupling mechanism 34B may be structured to employ the rotating operation in addition to the operation of insertion in the axial direction, in order to attach the valve support member 30B to the tubular body 12B.

Open-Close Device 10 for Fuel Tank According to Second Embodiment (5)-1 Valve Chest-Defining Member 53

Figure 16:
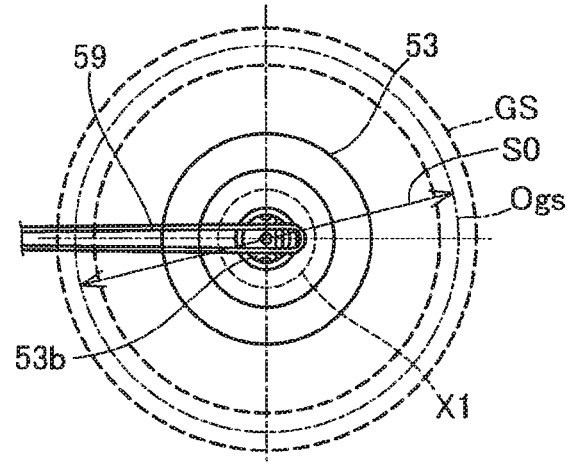
FIG. 16 is an arrow view taken along an arrow A in FIG. 7 and an enlarged view x1 illustrating the neighborhood of a spring support end of a valve chest-defining member.
Figure 16:
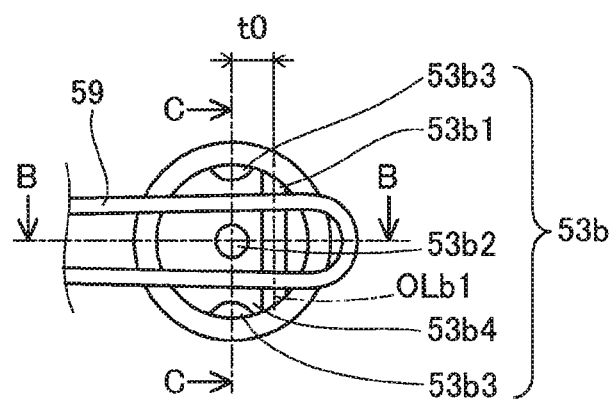

FIG. 16 is an arrow view taken along an arrow A in FIG. 7 and an enlarged view x1 illustrating the neighborhood of the spring support end 53b of the valve chest-defining member 53. The arrow view A of FIG. 16 illustrates the periphery of the spring support end 53b of the valve chest-defining member 53. As shown by the arrow view A of FIG. 16, in the state that the flap valve mechanism 50 closes the filler port 30a (hereinafter simply referred to as "valve closed state"), the spring support end 53b comes in contact with the spring 59. The arrow view A of FIG. 16 also illustrates a ring-shaped gasket GS and a center line Ogs of the gasket GS. The center line Ogs has a diameter S0. As shown in an enlarged view X1 in the arrow view A of FIG. 16, the spring support end 53b includes a plane portion 53b4, a contact protrusion 53b1 that is configured to come in contact with the spring 59, a center protrusion 53b2 and outer protrusions 53b3. The contact protrusion 53b1, the center protrusion 53b2 and outer protrusions 53b3 are formed to be protruded from the plane portion 53b4 as the basis formed in a planar shape in a direction to come in contact with the spring 59. The center protrusion 53b2 is formed in a columnar shape to be located at the center of the valve chest-defining member 53. The outer protrusions 53b3 are formed in the sprint support end 53b to pass through the center of the valve chest-defining member 53 and to be protruded toward respective ends along the axial center of the shaft body 55b of the shaft member 55. The outer protrusion 53b3 is formed in a partly-cut columnar shape that is cut by the outer frame of the spring support end 53b. The contact protrusion 53b1 is provided to be parallel to the axial center of the shaft body 55b and to be formed about a center line OLb1 that is away from the center of the spring support end 53b by a length t0 with respect to the axial center of the shaft body 55b as the center of rotation of the spring 59. In other words, the contact protrusion 53b1 is formed in a location near to a free end side of the open-close member 51 that is opposite to its rotating shaft side. The center of the spring support end 53b is at the position intersecting the spring support end 53b along the axial direction passing through the center of gravity of the open-close member 51. In the description of the second embodiment, the state of not forming on the rotating shaft side relative to the center of the spring support end 53b is expressed as the state of forming on the free end side.

According to this embodiment, the relationship between the diameter S0 of the center line Ogs of the gasket GS and the length t0 that denotes the distance from the contact protrusion 53b1 to the spring support end 53b is set to the relationship of Expression (1) given below:

[Math. 1]

$$0.015 \leq t0/S0 \leq 0.1 \tag{1}$$

Satisfying the relationship of Expression (1) provides the better effect of increasing the amount of the air flowing from the outside air to the fuel tank in the case where the fuel tank has a negative pressure as described later.

Figure 17:
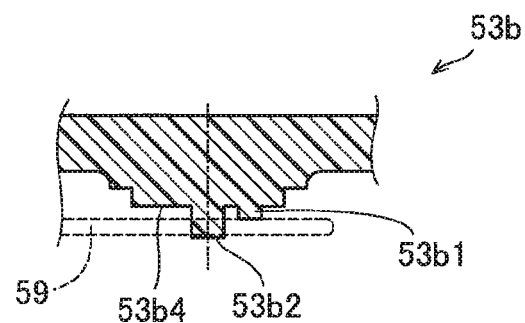
FIG. 17 is a sectional view taken on a line B-B in the enlarged view X1 of FIG. 16.

FIG. 17 is a sectional view taken on a line B-B in the enlarged view of FIG. 16. As shown in FIG. 17, the contact protrusion 53b1 and the center protrusion 53b2 are formed to be protruded from the plane portion 53b4. The center protrusion 53b2 is formed to have the amount protruded from the plane portion 53b4 (amount of protrusion) greater than the amount of protrusion of the contact protrusion 53b1 from the plane portion 53b4. In the valve closed state, the spring 59 is in contact with the contact protrusion 53b1. The contact protrusion 53b1 is formed such that the dimension as the sum of the amount of protrusion from the plane portion 53b4 and the thickness (diameter) of the spring 59 is less than the amount of protrusion of the center protrusion 53b2 from the plane portion 53b4 in the valve closed state.

Figure 18:
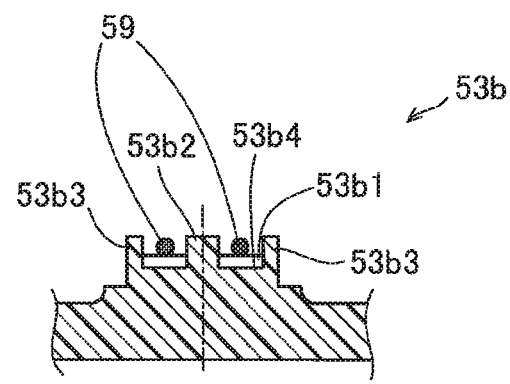
FIG. 18 is a sectional view taken on a ling C-C in the enlarged view X1 of FIG. 16.

FIG. 18 is a sectional view taken on a ling C-C in the enlarged view X1 of FIG. 16. As shown in FIG. 18, the outer protrusions 53b3 are formed to have the amount of protrusion from the plane portion 53b4 equal to the amount of protrusion of the center protrusion 53b2 from the plane portion 53b4. The center protrusion 43b2 and the outer protrusions 53b3 are formed to pass through the center of the spring support end 53b and to be arranged across a wider distance than the diameter of the spring 59 in the direction along the axial center of the shaft body 55b.

Figure 19:
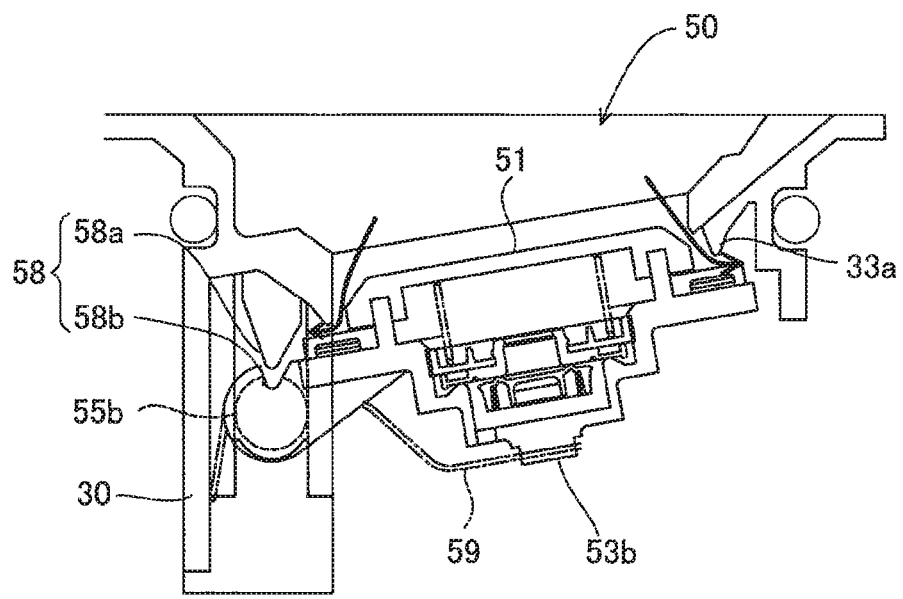
FIG. 19 is a diagram illustrating the open-close operations of a flap valve mechanism according to a second embodiment.

(5)-2 Functions and Advantageous Effects of Flap Valve Mechanism 50 of Second Embodiment FIG. 19 is a diagram illustrating the open-close operations of the flap valve mechanism 50 according to the second embodiment. FIG. 19 illustrates the state that the flap valve mechanism 50 is opened to communicate with the filler port 30a (hereinafter referred to as "valve open state") due to the pressure difference between the outside air and the fuel tank in the case where the fuel tank has a negative pressure. In the configuration of the second embodiment, when the flap valve mechanism 50 is changed from the valve closed state to the valve open state, the spring 59 comes in contact with the contact protrusion 53b1 of the spring support end 53b, as shown in FIG. 17 and FIG. 18. This causes the open-close member 51 to rotate about the shaft body 55b and to be translated toward the fuel tank side even when the pressing force of the spring 59 to press the open-close member 51 is unchanged, as shown in FIG. 19. This increases the space defined by the open-close member 51 and the valve support member 30 in the valve open state. This results in increasing the amount of the air flowing from the outside air to the fuel tank in the case where the fuel tank has a negative pressure. In the open-close device 10 for fuel tank according to the second embodiment, the rotation restricting mechanism 58 restricts a change in location of the open-close member 51 at the first position P1 and at the second position P2 and a change in direction of the open-close member 51 relative to the valve support member 30 by rotation. Another configuration of the open-close device 10 for fuel tank without the rotation restricting mechanism 58 according to another embodiment can also increase the amount of the air flowing from the outside air to the fuel tank in the case where the fuel tank has a negative pressure. Another embodiment may include, for example, the flap valve mechanism 50 configured to simply rotate the open-close member 51 only by the pressure difference between the fuel tank and the outside air and the pressing force of the spring 59. As long as a space is provided between the shaft member 55 and the bearing 45, this modified configuration can also increase the amount of the air flowing from the outside air to the fuel tank in the case where the fuel tank has a negative pressure.

Figure 20:
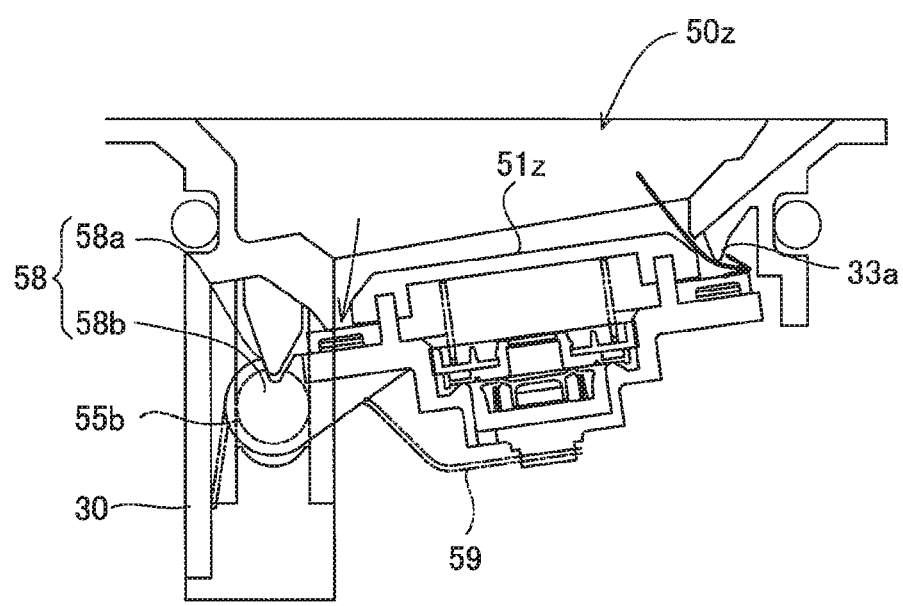
FIG. 20 is a diagram illustrating the open-close operations of a flap valve mechanism according to a comparative example.

FIG. 20 is a diagram illustrating the open-close operations of a flap valve mechanism 50z according to a comparative example. FIG. 20 illustrates the valve open state of the flap valve mechanism 50z of the comparative example in the case where the fuel tank has a negative pressure. The flap valve mechanism 50z of the comparative example differs from the flap valve mechanism 50 of the second embodiment only by that the position where the spring 59 comes in contact with the spring support end 53b shown in FIGS. 17 and 18 in response to a change from the valve closed state to the valve open state is on the shaft body 55b-side relative to the center of the spring support end 53b. Even when an open-close member 51z of the comparative example is pressed by the same pressing force of the spring 59 as the pressing force to press the open-close member 51 of the second embodiment, the amount of translation of the open-close member 51z of the comparative example toward the fuel tank is less than the amount of translation of the open-close member 51 of the second embodiment since the position where the spring 59 comes in contact with the spring support end 53b is on the shaft body 55-side. The comparative example accordingly provides a smaller space defined by the open-close member 51z and the valve support member 30 in the valve open state, compared with the second embodiment. The flap valve mechanism 50z of the comparative example accordingly has the less amount of the air flowing from the outside air to the fuel tank in the case where the fuel tank has a negative pressure, compared with the flap valve mechanism 50 of the second embodiment.

In the flap valve mechanism 50 of the second embodiment, the contact protrusion 53b1 as the part of the open-close member 51 which the spring 59 first comes in contact with in response to a change from the valve closed state to the valve open state is formed to be protruded from the spring support end 53b. The position of contact where the spring 59 comes in contact with the contact protrusion 53b1 may be changed by changing the position of the contact protrusion 53b1. This improves the flexibility of design.

In the flap valve mechanism 50 of the second embodiment, the contact protrusion 53b1 is formed parallel to the axial center of the shaft body 55b, Even when the position of contact where the spring 59 comes in contact with the spring support end 53b is shifted by, for example, deformation or shift in position of the spring 59, this configuration keeps the distance from the center of the shaft body 55b as the center of rotation of the open-close member 51 to the contact protrusion 53b1 unchanged. This ensures the constant inflow of the air flowing from the outside air in the valve open state of the flap valve mechanism 50 in the case where the fuel tank has a negative pressure.

In the flap valve mechanism 50 of the second embodiment, the contact protrusion 53b1 is formed larger than the contact area with the spring 59. This configuration ensures that the spring 59 first comes in contact with the contact protrusion 53b1 when the flap valve mechanism 50 is changed from the valve closed state to the valve open state, even in the case where the spring 59 is deformed or shifted in position. This ensures the constant inflow of the air flowing from the outside air in the valve open state of the flap valve mechanism 50 in the case where the fuel tank has a negative pressure.

In the flap valve mechanism 50 of the second embodiment, the center protrusion 53b2 and the outer protrusions 53b3 are formed on the spring support end 53b. This configuration restricts the position of the spring 59 along the axial direction of the shaft body 55b in a certain range even in the case where the spring 59 is deformed or shifted. This configuration ensures that the spring 59 first comes in contact with the contact protrusion 53b1 when the flap valve mechanism 50 is changed from the valve closed state to the valve open state. The flap valve mechanism 50 can thus keep the constant inflow of the air flowing from the outside air in the valve open state of the flap valve mechanism 50 in the case where the fuel tank has a negative pressure.

(5)-3 Modifications of Second Embodiment

The invention is not limited to the above embodiment, but a diversity of variations and modifications may be made to the embodiment without departing from the scope of the invention. Some examples of possible modification are described below.

In the configuration of the second embodiment, the flap valve mechanism 50 includes the shaft support mechanism 54 including the rotation restricting mechanism 58 and the gasket GS placed in the open-close member 51. These components are, however, not essential, and the configuration of the flap valve mechanism 50 may be modified in various ways. The open-close member 51 included in the flap valve mechanism 50 may be configured to rotate about the axial center of the shaft body 55b which is located at the fixed position relative to the valve support member 30, irrespective of the load applied.

In the configuration of the second embodiment, the contact protrusion 53b1 is formed as the protrusion parallel along the axial center of the shaft body 55b. The shape and the configuration of the contact protrusion 53b1 may be modified in various ways. The contact protrusion 53b1 may be formed over the entire surface in a location farther from the shaft body 55b than the center of the spring support end 53b. The contact protrusion 53b1 may be formed as a small columnar projection on the plane portion 53b4.

The center protrusion 53b2 and the outer protrusions 53b3 may not be essential and may be formed in various shapes or configurations. Neither the center protrusion 53b2 nor the outer protrusions 53b3 may be formed on the spring support end 53b, or only either the center protrusion 53b2 or the outer protrusions 53b3 may be formed on the spring support end 53b. The center protrusion 53b2 and the outer protrusions 53b3 may have different amounts of protrusion from the plane portion 53b4. The center protrusion 53b2 and the outer protrusions 53b3 may be formed in any configuration that restricts the position of the spring 59 which comes in contact with the contact protrusion 53b1 on a plane parallel to the spring support end 53b.

Figure 21A:
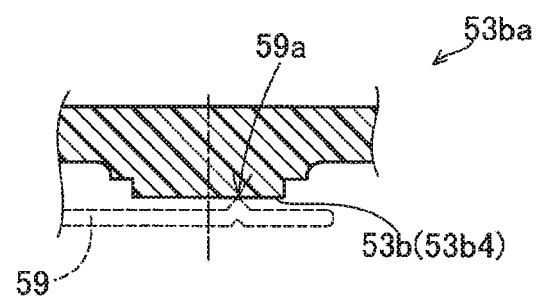
FIGS. 21A and 21B are sectional views illustrating a spring support end according to modifications of the second embodiment.
Figure 21B:
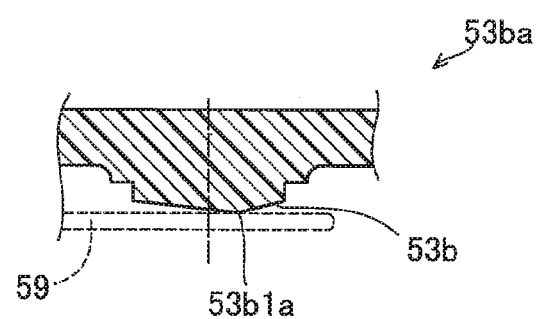

In the configuration of the second embodiment, the contact protrusion 53b1 is formed as a projection on the spring support end 53b, so that the spring 59 first comes in contact with the contact protrusion 53b1 when the flap valve mechanism 50 is changed from the valve closed state to the valve open state. The position of contact where the spring 59 comes in contact with the contact protrusion 53b1 is, however, not limited to this configuration but may be modified in various ways. FIGS. 21A and 21B are sectional views illustrating the spring support end 53 according to modifications of the second embodiment. The sectional views of the modifications shown in FIGS. 21A and 21B corresponds to the sectional view taken on the line B-B in FIG. 16. FIG. 21A illustrates a modification that the spring 59 has a spring protrusion 59a, in place of the contact protrusion 53b1 of the second embodiment. In the modification of FIG. 21A, the spring support end 53ba is formed as a plane including only the plane portion 53b4 and excluding the contact protrusion 53b1 and the other protrusions of the second embodiment. Instead, the spring 59 has the spring protrusion 59a that is protruded in the direction of pressing the open-close member 51. In the valve closed state of the flap valve mechanism 50, the spring protrusion 59a formed to be in contact with a location farther from the shaft body 55b than the center of the spring support end 53b comes in contact with the spring support end 53b.

In the configuration of FIG. 21B, a spring support end 53ba includes a contact protrusion 53b1a that is formed by an inclined surface to protruded the spring support end 53b, in place of the contact protrusion 53b1 of the second embodiment. In the modification of FIG. 21B, in the valve closed state of the flap valve mechanism 50, the contact protrusion 53b1a formed to be in contact with a location farther from the shaft body 55b than the center of the spring support end 53b comes in contact with the spring 59. As described above, the positional relationship between the open-close member 51 and the spring 59 such as to come in contact with each other at the location farther from the shaft body 55b than the center of the spring support end 53b may be modified in various ways.

(6) Open-Close Device 10 for Fuel Tank According to Third Embodiment (6)-1 First Restricting Element 35a1 and Second Restricting Element 35b2

Figure 22:
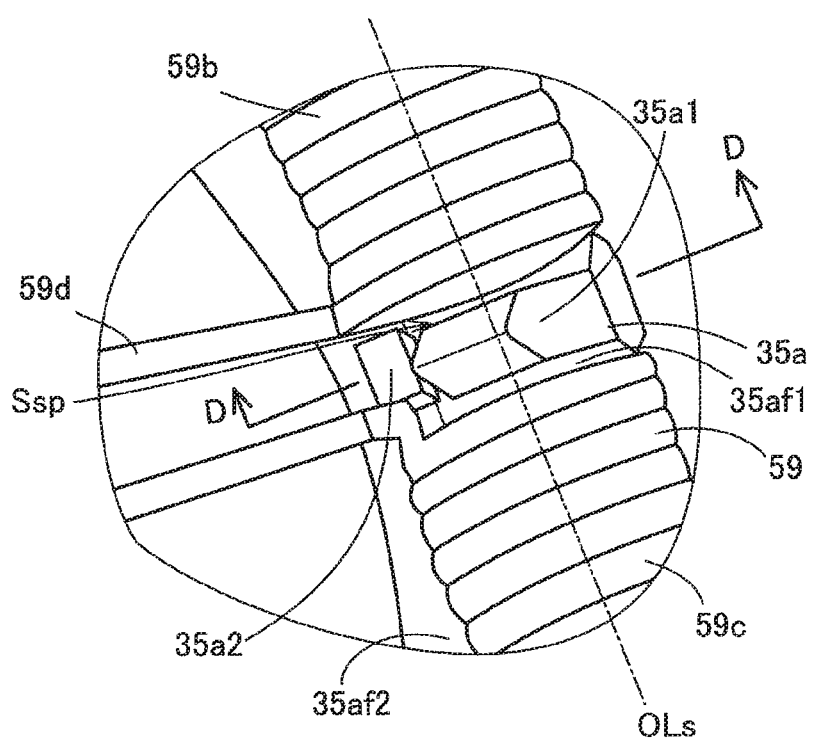
FIG. 22 is a perspective view illustrating the neighborhood of a first restricting element and a second restricting element configured to restrict the position of a spring according to a third embodiment.
Figure 23:
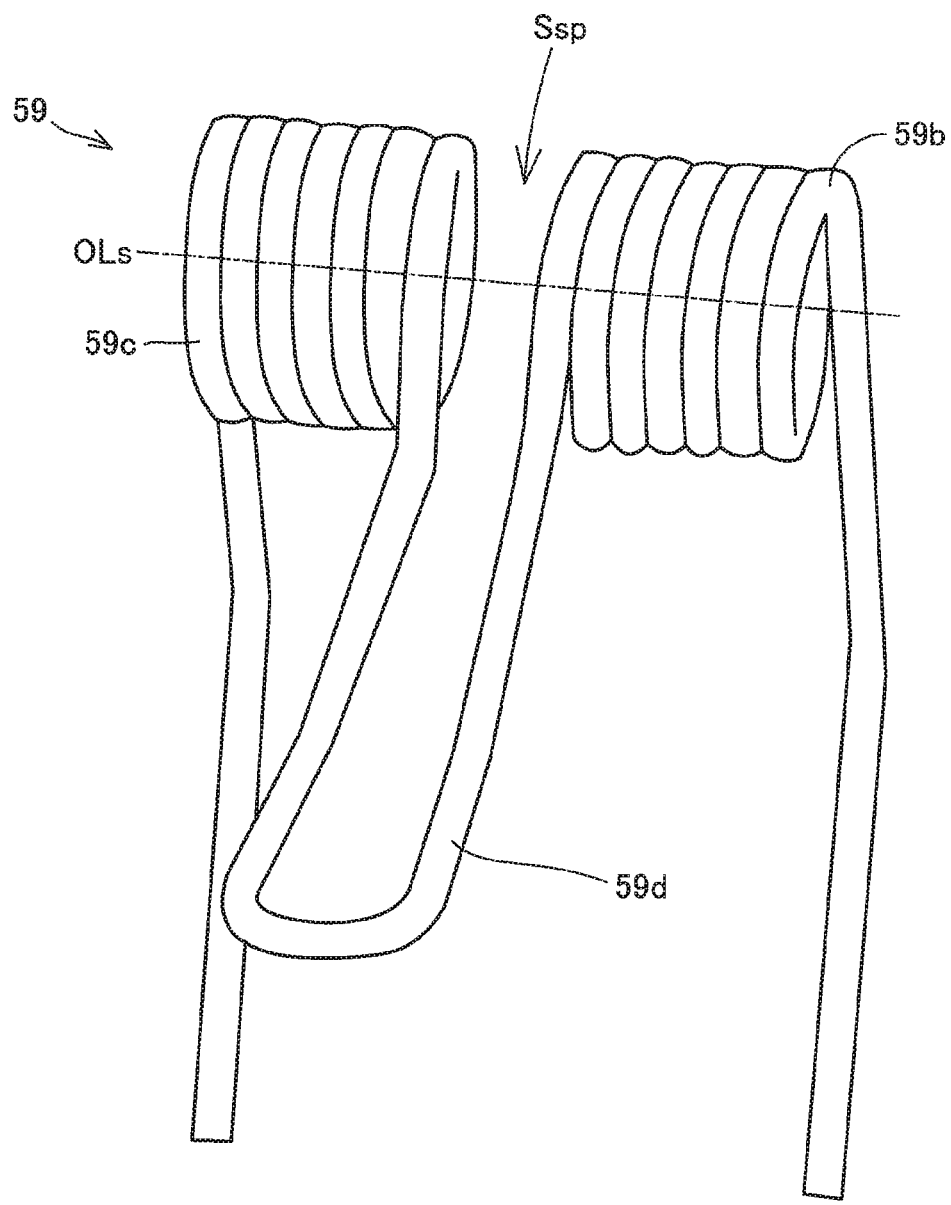
FIG. 23 is an appearance diagram illustrating the spring according to the third embodiment.

FIG. 22 is a perspective view illustrating the neighborhood of a first restricting element 35a1 and a second restricting element 35a2 configured to restrict the position of a spring 59 according to a third embodiment. FIG. 23 is an appearance diagram illustrating the spring 59 according to the third embodiment. The spring 59 of the third embodiment is a double torsion spring having two coil portions 59b and 59c formed away from each other. As shown in FIG. 23, the spring 59 includes a pressing portion 59d that is placed between the first coil portion 59b and the second coil portion 59c to press the open-close member 51 in a valve closing direction when the spring 59 is assembled to the open-close device 10. The pressing portion 59d is formed to be protruded in the outer circumferential direction of a center axis OLs of the two coil portions 59b and 59c. In the spring 59, respective ends of the two coil portions 59b and 59c that are not connected with the pressing portion 59d are fixed to a base section 35a of the valve support member 30. The spring 59 accordingly presses the open-close member 51 in the valve closing direction in the flap valve mechanism 50.

As shown in FIG. 22, the first restricting element 53a1 and the second restricting element 53a2 are formed on the base section 35a to be placed in a space Ssp between the first coil portion 59b and the second coil portion 59c when the spring 59 is assembled to the flap valve mechanism 5. The first restricting element 35a1 is protruded from a first surface 35af1 of the base section 35a parallel to the axial direction of the valve support member 30 toward the axial center. A section of the first restricting element 35a1 perpendicular to the axial direction of the valve support member 30 is in a combined shape of an isosceles triangle on the axial center side and a rectangle on the base section 35-side. The second restricting element 35a2 is protruded from a second surface 35f2 that is perpendicular to the first surface 35af1 on which the first restricting element 35a1 is formed, toward the tank side. The second restricting element 35a2 is formed in a rectangular parallelepiped shape to be protruded from the base section 35a toward the tank side. The first restricting element 35a1 and the second restricting element 35a2 are arranged symmetrically about an identical plane that is perpendicular to the center axis OLs of the spring 59 placed in the valve support member 30.

Figure 24:
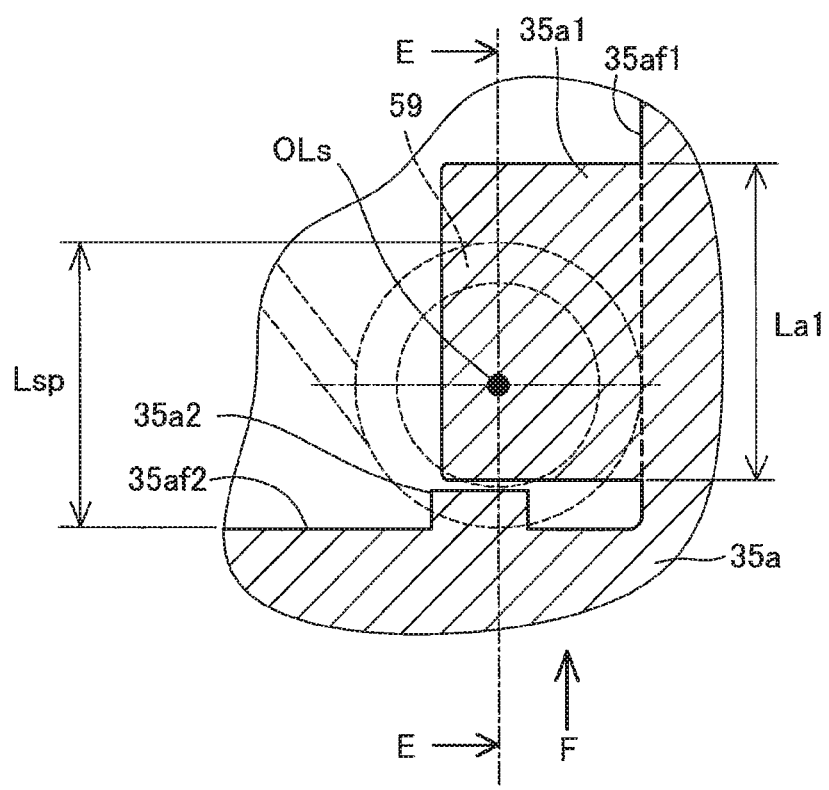
FIG. 24 is a sectional view taken on a line D-D in FIG. 22.

FIG. 24 is a sectional view taken on a line D-D in FIG. 22. The sectional view of FIG. 24 is perpendicular to the center axis OLs of the spring 59 and is along the line D-D that goes through the center axis of the first restricting element 35a1 and the second restricting element 35a2. As shown in FIG. 24, the spring 59 has a diameter of length Lsp at the section relative to the center axis OLs. The first restricting element 35a1 protruded from the first surface 35af1 of the base section 35a has a length La1 along the axial direction of the valve support member 30. According to the third embodiment, the first restricting element 35a1 is formed to have the length La1 that is greater than the length Lsp of the diameter of the spring 59. The first restricting element 35a1 protruded from the first surface 35af1 of the base section 35a1 is formed to have a length along a plane perpendicular to the center axis OLs that is greater than the radius of the spring 59 placed therein.

As shown in FIG. 24, the second restricting element 35a2 is formed in a rectangular parallelepiped shape to be protruded from the second surface 35af2 of the base section 35a that is perpendicular to the first surface 35af1. The height of the second restricting element 35a2 from the second surface 35af2 is made less than the distance from the second surface 35af2 to the first restricting element 35a1 along the axial direction of the valve support member 30. This configuration does not cause the first restricting element 35a1 to be in contact with the second restricting element 35a2. The width of the second restricting element 35a2 along the outer circumferential direction relative to the axial direction of the valve support member 30 is made less than the length Lsp of the spring 59. In the open-close device 10 for fuel tank according to the third embodiment, the spring 59 is in contact with the first surface 35af1 and the second surface 35af2.

Figure 25:
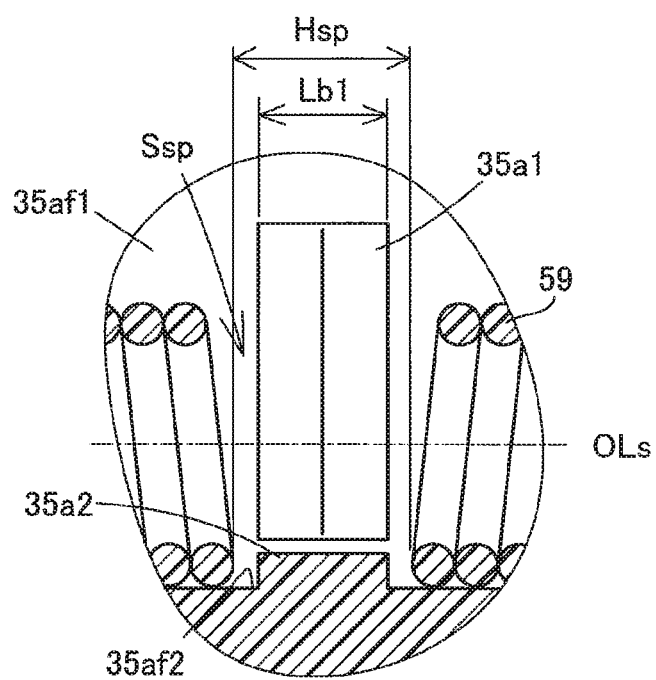
FIG. 25 is a sectional view taken on a line E-E in FIG. 22.

FIG. 25 is a sectional view taken on a line E-E in FIG. 24. The sectional view of FIG. 25 is along the axial direction of the valve support member 30 that goes through the center axis OLs of the spring 59. As shown in FIG. 25, in the state that the spring 59 closes the open-close member 51, the space Ssp defined by the first coil portion 59b and the second coil portion 59c has a length Hsp along the center axis OLs. The length Hsp denotes a distance along the center axis OLs at the position where the first coil portion 59b and the second coil portion 59c are closest to each other. The first restricting element 35a1 and the second restricting element 35a2 have a length Lb1 along the center axis OLs. According to the third embodiment, the first restricting element 35a1 and the second restricting element 35a2 are formed to have the length Lb1 along the center axis OLs that is 85 percent (%) of the length Hsp of the space Ssp.

Figure 26A:
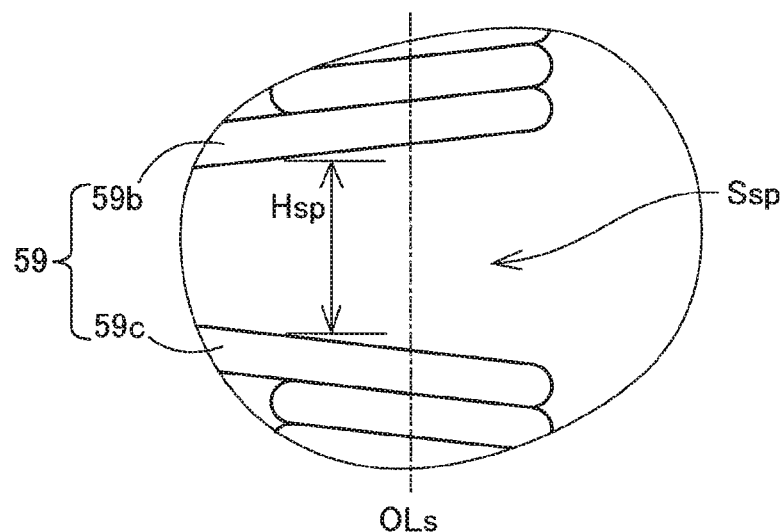
FIGS. 26A and 26B are schematic diagrams illustrating part of the spring of the third embodiment that is changed according to the opening-closing degree of an open-close member.
Figure 26B:
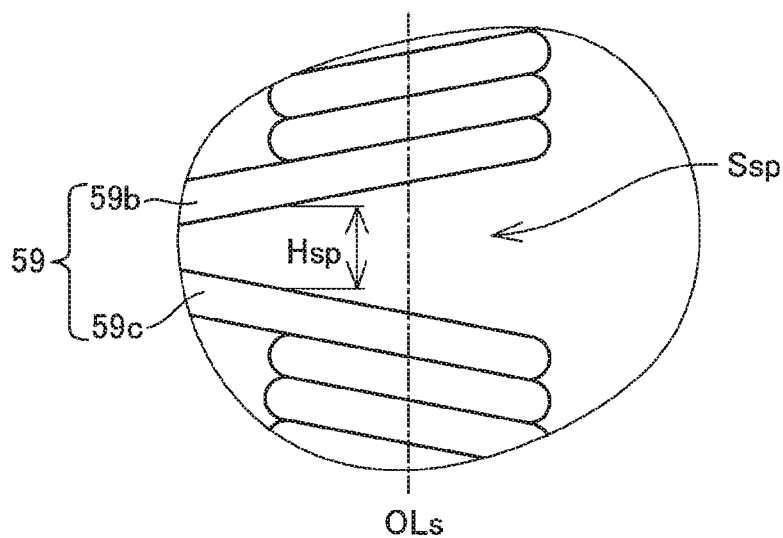

(6)-2 Functions and Advantageous Effects of Open-Close Device 10 for Fuel Tank According to Third Embodiment FIGS. 26A and 26B are schematic diagrams illustrating part of the spring 59 of the third embodiment that is changed according to the opening-closing degree of the open-close member 51. FIGS. 26A and 26B are arrow views illustrating only the spring 59, viewed from an arrow F in FIG. 24. FIG. 26A illustrates part of the coil portions 59b and 59c in the vicinity of the first restricting element 35a1 when the flap valve mechanism 50 is in the valve closed state. FIG. 26B illustrates part of the coil portions 59b and 59c in the vicinity of the first restricting element 35a1 in the state that the flap valve mechanism 50 is slightly opened from the valve closed state. As shown in FIGS. 26A and 26B, the spring 59 is the double torsion spring, so that the space Ssp between the first coil portion 59b and the second coil portion 59c along the center axis OLs is changed according to the opening-closing degree of the open-close member 51. As shown in FIGS. 26A and 26B, the length Hsp of the space Ssp between the coil portions 59b and 59c is changed by opening the open-close member 51. More specifically, the space Ssp between the first coil portion 59b and the second coil portion 59 along the center axis OLs decreases with an increase in valve opening degree of the open-close member 51.

Figure 27A:
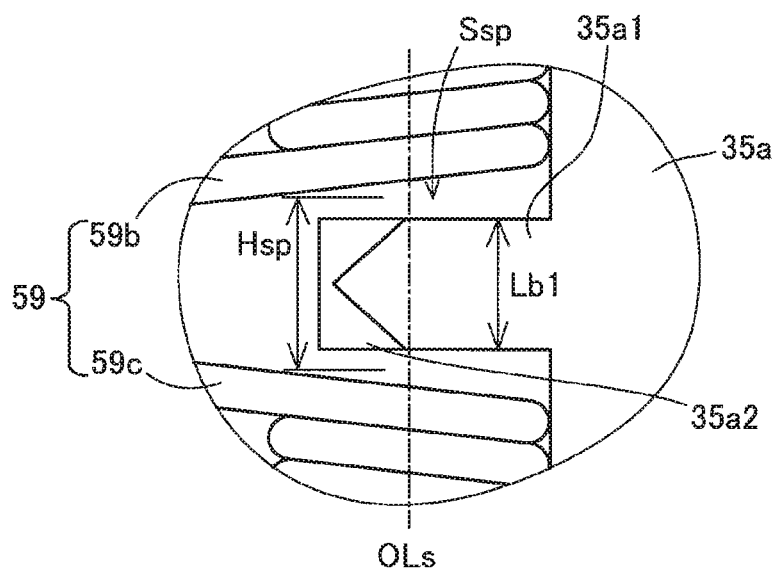
FIGS. 27A and 27B are schematic diagrams illustrating part of the spring of the third embodiment that is changed according to the opening-closing degree of the open-close member.
Figure 27B:
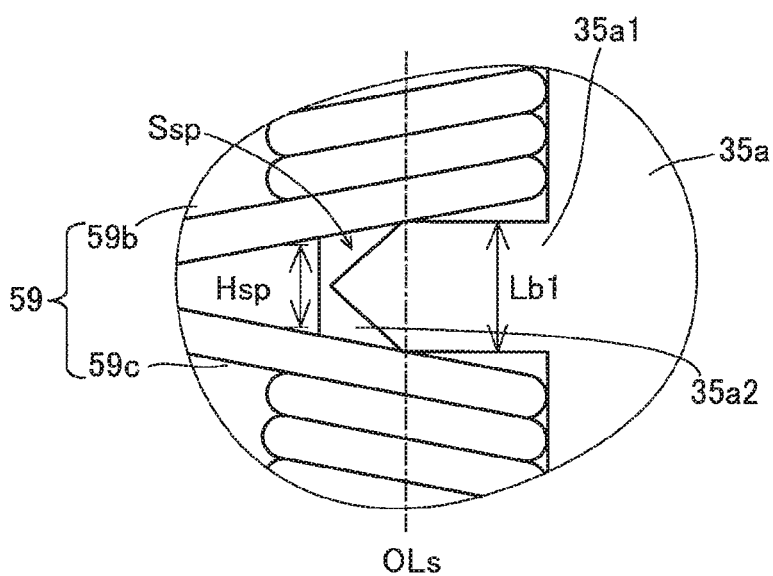

FIGS. 27A and 27B are schematic diagrams illustrating part of the spring 59 of the third embodiment that is changed according to the opening-closing degree of the open-close member 51. FIGS. 27A and 27B are arrow views illustrating the neighborhood of the first restricting element 35a1, viewed from the arrow F in FIG. 24. FIGS. 27A and 27B illustrate the first restricting element 35a1 and the second restricting element 35a2, in addition to the spring 59 shown in FIGS. 26A and 26B. As shown in FIG. 27A, when the flap valve mechanism 50 is in the valve closed state, the length Hsp of the space Ssp of the spring 59 is greater than the length Lb1 of the first restricting element 35a1 along the center axis OLs, so that the spring 59 is not in contact with the first restricting element 35a1. As shown in FIG. 27B, when the flap valve mechanism 50 is opened to or over a certain opening degree, the length Hsp of the space Ssp of the spring 59 becomes less than the length Lb1 of the first restricting element 35a1, so that the spring 59 comes in contact with the first restricting element 35a1. In other words, when the flap valve mechanism 50 is opened to or above a certain opening degree, the first restricting element 35a1 serves to restrict deformation of the spring 59.

As described above, in the open-close device 10 for fuel tank according to the third embodiment, the first restricting portion 35a1 is formed on the base section 35a to be placed in the space Ssp between the first coil portion 59b and the second coil portion 59c of the spring 59 that is the double torsion spring. The first restricting element 35a1 serves to restrict deformation of the spring 59 along the center axis OLs in the direction of reducing the space Ssp and shift of the spring 59 in one direction along the center axis OLs by opening and closing the open-close member 51. Compared with the prior art open-close device for fuel tank, the open-close device 10 for fuel tank of the third embodiment effectively restricts deformation of the spring 59 and shift in position of the spring 59. This configuration enables the spring 59 to press the flap valve mechanism 50 with a predetermined force, irrespective of the opening-closing operation of the open-close member 51. In terms of the durability, the first restricting element 35a1 restricts elastic deformation of the spring 59 in a certain range, even when the flap valve mechanism 50 is opened and closed a plurality of times. This suppresses plastic deformation of the spring 59 and enables the spring 59 to keep pressing the flap valve mechanism 50 with a predetermined pressing force.

In the open-close device 10 for fuel tank according to the third embodiment, the length of the first restricting element 35a1 that is protruded from the first surface 35af1 of the base section 35a, along the plane perpendicular to the center axis OLs is greater than the radius of the spring 59 placed therein. The configuration of the open-close device 10 for fuel tank of the third embodiment thus more effectively restricts deformation and shift in position of the spring 59.

In the open-close device 10 for fuel tank according to the third embodiment, the first restricting element 35a1 is formed on the base section 35a to be protruded from the first surface 35af1 of the base section 35a along the section perpendicular to the center axis OLs. The first restricting element 35a1 is formed such that the length La1 of the first restricting element 35a1 along the first surface 35af1 is greater than the length Lsp of diameter of the spring 59. In the open-close device 10 for fuel tank of the third embodiment, the first restricting element 35a1 is placed as the center of positioning on the valve support member 30. The length La1 of the first restricting element 35a1 along the first surface 35af1 which serves as the guide of positioning is greater than the diameter of the spring 59. This configuration facilitates manufacture of the open-close device 10 for fuel tank.

In the open-close device 10 for fuel tank according to the third embodiment, the second restricting element 35a2 is formed to be protruded from the second surface 35af2 that is perpendicular to the first surface 35af1 on which the first restricting element 35a1 is formed. In the open-close device 10 for fuel tank of the third embodiment, both the first surface 35af1 and the second surface 35af2 which the spring 59 comes in contact with serve to suppress deformation of the spring 59 and shift in position of the spring 59. This configuration enables the spring 59 to more effectively press the flap valve mechanism 50 with a predetermined force, irrespective of the opening-closing operation of the open-close member 51.

In the open-close device 10 for fuel tank according to the third embodiment, the first restricting element 35a1 is formed to have the length Lb1 that is 85 percent WO of the length Hsp of the space Ssp as shown in FIG. 25. Accordingly the first restricting element 35a1 does not unnecessarily come in contact with and restrict the spring 59 in the range where the open-close member 51 is opened and closed. The open-close device 10 for fuel tank of the third embodiment thus enables the spring 59 to press the flap valve mechanism 50 with a more accurate predetermined force, irrespective of the opening-closing operation of the open-close member 51.

(6)-3 Modifications of Third Embodiment

The invention is not limited to the above embodiment, but a diversity of variations and modifications may be made to the embodiment without departing from the scope of the invention. Some examples of possible modification are described below.

In the configuration of the third embodiment, the second restricting element 35a2 is formed on the second surface 35af1 that is perpendicular to the first surface 35af1. The presence/absence of the second restricting element 35a2 and its shape and configuration may be modified in various ways. One modification may include only the first restricting element 35a1 and exclude the second restricting element 35a2. The second restricting element 35a2 is formed in the rectangular parallelepiped shape to be protruded from the second surface 35af2 in the third embodiment, but may be formed in a shape other than the rectangular parallelepiped shape, for example, a columnar shape. With regard to the dimension of the second restricting element 35a2, the length Lb1 of the second restricting element 35a2 along the center axis OLs is equal to the length of the first restricting element 35a1 according to the third embodiment, but may be a different length. Various modifications may also be allowed with respect to the amounts of protrusion of the first restricting element 35a1 and the second restricting element 35a2 from the base section 35a in the direction toward the spring 59. The height of protrusion of the second restricting element 35a2 from the second surface 35af2 is greater than the thickness of winding of the spring 59 according to the third embodiment, but may be equal to or may be less than the thickness of wiring of the spring 59. The second surface 35af2 on which the second restricting element 35a2 is formed is the surface perpendicular to the first surface 35af1 in the third embodiment. The second surface 35af2 may, however, be necessarily the perpendicular surface but may be provided as a surface intersecting the first surface 35af1 at an angle other than 90 degrees to come in contact with the spring 59. According to another modification, the first surface 35af1 and the second surface 35af2 may not be necessarily arranged to be in contact with the spring 59 but may be arranged to be away from the spring 59. The first restricting element 35a1 and the second restricting element 35a2 are formed about the same section that is perpendicular to the center axis OLs according to the third embodiment. According to modifications, the first restricting element 35a1 and the second restricting element 35a2 may be formed about different planes or may be formed about a plane that is not perpendicular to the center axis OLs. The first restricting element 35a1 and the second restricting element 35a2 may not be necessarily formed in line symmetric shape.

The section of the first restricting element 35a1 perpendicular to the axial direction of the valve support member 30 is formed in the combined shape of the isosceles triangle on the leading end side and the rectangle on the base section 35-side. The shape of the first restricting element 35a1 may be modified in various ways. For example, the shape of the first restricting element 35a1 may be a rectangular parallelepiped shape like the second restricting element 35a2 or may be a tapered shape. The length La1 of the first restricting element 35a1 is greater than the length Lsp of diameter of the spring 59 in the third embodiment. The relationship between the length La1 of the first restricting element 35a1 and the length Lsp of diameter of the spring 59 is, however, not limited to this configuration but may be modified in various ways. For example, the length La1 of the first restricting element 35a1 may be equal to the length Lsp of diameter of the spring 59 or may be less than the length Lsp of diameter of the spring 59.

In the configuration of the third embodiment, the length Lb1 of the first restricting element 35a1 along the center axis OLs is 85% of the length Hsp of the space Ssp between the first coil portion 59b and the second coil portion 59c along the center axis OLs. The length Lb1 may however, not be necessarily limited to this value but may be modified in various ways. For example, the length of the first restricting element 35a1 along the center axis OLs may be greater than 85% or may be less than 85% of the length Hsp of the space Ssp. The length of the first restricting element 35a1 along the center axis OLs is preferably between 70% and 95% inclusive, of the length Hsp of the space Ssp. The third embodiment describes measurement of the length Hsp of the space Ssp in the state that the spring 59 is placed in the valve support member 30 as one example of measurement method. Another measurement method may measure the length Hsp of the space Ssp in the spring 59 alone before the spring 59 is placed in the valve support member 30.

Figure 28:
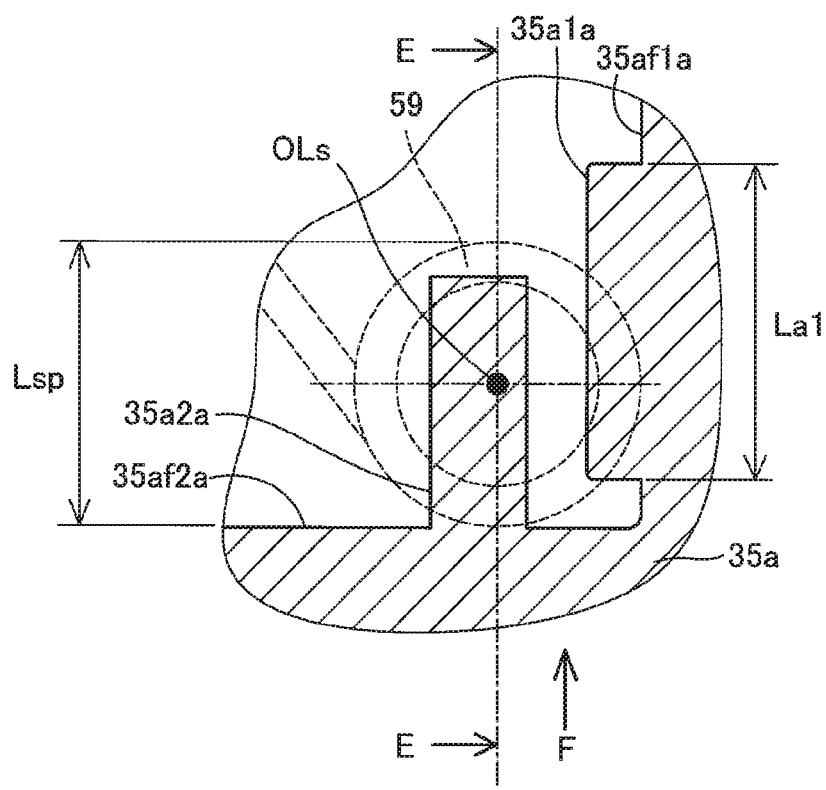
FIG. 28 is a sectional view illustrating the neighborhood of a second restricting element according to a modification of the third embodiment.

FIG. 28 is a sectional view illustrating the neighborhood of a second restricting element 35a2a according to a modification of the third embodiment. The sectional view of the modification of the third embodiment shown in FIG. 28 corresponds to the sectional view of the third embodiment taken on the line D-D in FIG. 22. This modification differs from the third embodiment by the shapes of a first restricting element 35a1a and a second restricting element 35a2a, but otherwise has configuration and shapes similar to those of the third embodiment. As shown in FIG. 28, the amount of protrusion of the second restricting element 35a2a from the base section 35a to be perpendicular to the center axis OLs and toward the direction where the spring 59 is placed is greater than the radius of the spring 59. The amount of protrusion of the first restricting element 35a1a from the base section 35a to be perpendicular to the center axis OLs and toward the direction where the spring 59 is placed is greater than the diameter of wiring of the spring 59 and smaller than the radius of the spring 59. This modification accordingly differs from the third embodiment that the amount of protrusion of the second restricting element 35a2a from the base section 35a toward the direction where the spring 59 is placed is greater than the amount of protrusion of the first restricting element 35a1a.

Figure 29A:
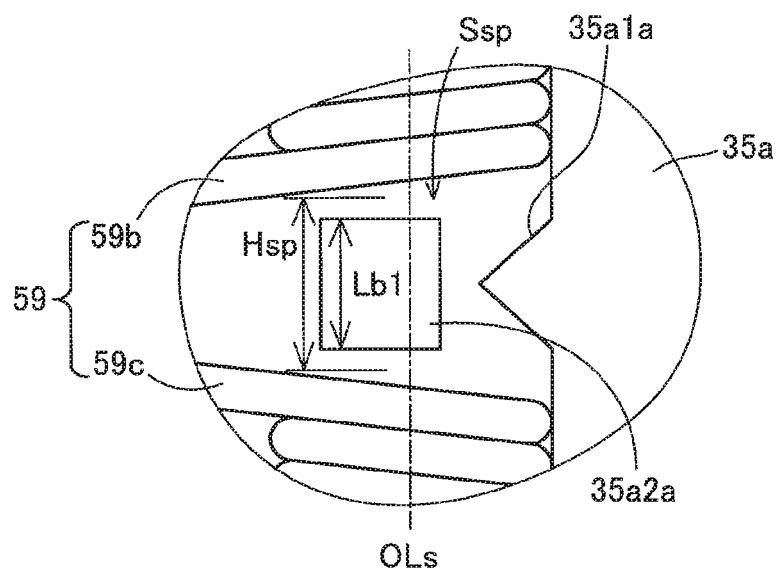
FIGS. 29A and 29B are schematic views illustrating part of the spring in a modification of the third embodiment that is changed according to the opening-closing degree of the open-close member.
Figure 29B:
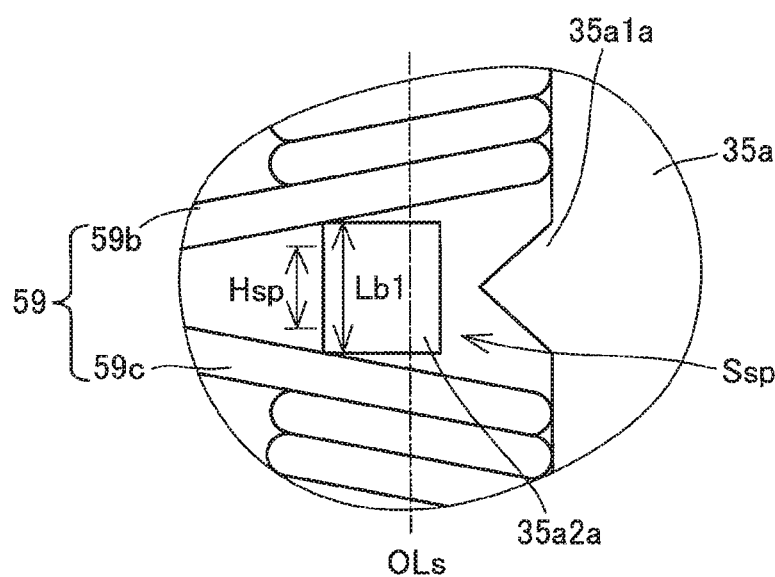

FIGS. 29A and 29B are schematic views illustrating part of the spring 59 in a modification of the third embodiment that is changed according to the opening-closing degree of the open-close member 51. FIGS. 29A and 29B are arrow views illustrating the neighborhood of the first restricting element 35a1a of the modification corresponding to the arrow views of the third embodiment viewed from the arrow F in FIG. 24. As shown in FIG. 29A, when the flap valve mechanism 50 is in the valve closed state, the length Hsp of the space Ssp of the spring 59 is greater than a length Lb1 of the second restricting element 35a2a along the center axis OLs, so that the spring 59 is not in contact with the second restricting element 35a2a. As shown in FIG. 29B, when the flap valve mechanism 50 is opened to or over a certain opening degree, the length Hsp of the space Ssp of the spring 59 becomes less than the length Lb1 of the second restricting element 35a2a, so that the spring 59 comes in contact with the second restricting element 35a2a. In other words, when the flap valve mechanism 50 is opened to or above a certain opening degree, the second restricting element 35a2a serves to restrict deformation of the spring 59. As described above, the arrangement of the protrusion configured to restrict deformation of the spring 59 may not be limited to the direction of the plane defined by the base section 35a but may be modified in various ways based on the positional relationship to the spring 59 placed therein.

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in SUMMARY may be replaced or combined appropriately in order to solve part or all of the problems described above. Any of the technical features may be omitted appropriately unless the technical feature is described as essential herein.

The invention claimed is:

1. An open-close device for fuel tank that is configured to open and close a fuel passage arranged to introduce a fuel supplied from a fueling nozzle into a fuel tank, the open-close device for fuel tank comprising:
    a filler port-forming member that is configured to form a filler port as a section of the fuel passage;
    an open-close member that is configured to open and close the filler port; and
    a double torsion spring that is configured to include a pressing portion arranged to press the open-close member in a valve closing direction and two coil portions connected with respective ends of the pressing portion and is supported by the filler port-forming member in a rotatable manner, wherein
    the double torsion spring has a space defined by the two coil portions, and
    the filler port-forming member has a restricting element that is placed in the space and is configured to restrict deformation of the double torsion spring, wherein
    the two coil portions are formed about an identical center axis, and
    the restricting element is protruded from a first surface of the filler port-forming member along a plane perpendicular to the center axis and is formed to be extended longer than a diameter of the coil portions along the first surface.

2. The open-close device for fuel tank according to claim 1, wherein
    the two coil portions are formed about an identical center axis, and
    at least one of restricting elements is protruded from a surface of the filler port-forming member on which the restricting element is formed, to the center axis along a direction where the double torsion spring is placed.

3. The open-close device for fuel tank according to claim 2, wherein the restricting element includes a first restricting element formed to be protruded from the first surface of the filler port-forming member along the plane perpendicular to the center axis, and a second restricting element formed to be protruded from a second surface- that is perpendicular to the first surface.

4. The open-close device for fuel tank according to claim 3, wherein the restricting element is configured to have a thickness along the center axis that is between 70 percent and 95 percent inclusive of a length of the space along the center axis when the double torsion spring closes the open-close member.

5. An open-close device for fuel tank that is configured to open and close a fuel passage arranged to introduce a fuel supplied from a fueling nozzle into a fuel tank, the open-close device for fuel tank comprising:
    a filler port-forming member that is configured to form a filler port as a section of the fuel passage;
    an open-close member that is configured to open and close the filler port; and
    a double torsion spring that is configured to include a pressing portion arranged to press the open-close member in a valve closing direction and two coil portions connected with respective ends of the pressing portion and is supported by the filler port-forming member in a rotatable manner, wherein
    the double torsion spring has a space defined by the two coil portions, and
    the filler port-forming member has a restricting element that is placed in the space and is configured to restrict deformation of the double torsion spring,
    a first restricting element that is at least one of the restricting elements is protruded from a first surface of the filler port-forming member along a direction where the double torsion spring is placed, and
    a section of the first restricting element along the first surface in a protruding direction is in an isosceles triangle shape that has two sides of an identical length forming an apex in the protruding direction.

6. The open-close device for fuel tank according to claim 5, wherein the section of the first restricting element along the first surface is in a combined shape of the isosceles triangle shape and a rectangle shape arranged to connect the isosceles triangle shape with the first surface.

7. An open-close device for fuel tank that is configured to open and close a fuel passage arranged to introduce a fuel supplied from a fueling nozzle into a fuel tank, the open-close device for fuel tank comprising:
    a filler port-forming member that is configured to form a filler port as a section of the fuel passage;
    an open-close member that is configured to open and close the filler port; and
    a double torsion spring that is configured to include a pressing portion arranged to press the open-close member in a valve closing direction and two coil portions connected with respective ends of the pressing portion and is supported by the filler port-forming member in a rotatable manner, wherein
    the double torsion spring has a space defined by the two coil portions, and
    the filler port-forming member has a restricting element that is placed in the space and is configured to restrict deformation of the double torsion spring,
    wherein the open-close member is provided to be rotatable relative to the filler port-forming member such as to be pressed at a rotating shaft end by the double torsion spring in a valve closing direction to close the filler port, and
    the open-close member comes in contact with the double torsion spring on a free end side opposite to the rotating shaft end in at least a valve closing state,
    the open-close member comes in contact with the double torsion spring at a protrusion formed on the free end side.

8. The open-close device for fuel tank according to claim 7, wherein the protrusion is formed parallel to a rotating shaft of the open-close member.

9. The open-close device for fuel tank according to claim 8, wherein the protrusion is formed to be wider than a contact area with the double torsion spring.

10. The open-close device for fuel tank according to claim 9, wherein the open-close member includes a spring restricting element configured to restrict position of the double torsion spring along a rotating shaft of the double torsion spring.

* * * * *